US007890517B2

(12) United States Patent
Angelo et al.

(10) Patent No.: US 7,890,517 B2
(45) Date of Patent: Feb. 15, 2011

(54) APPLIANCE FOR ENTERPRISE INFORMATION INTEGRATION AND ENTERPRISE RESOURCE INTEROPERABILITY PLATFORM AND METHODS

(75) Inventors: Robert F. Angelo, Sudbury, MA (US); Amir Azmi, Blemont, MA (US); Chandra Bajpai, Natick, MA (US); Colin P. Britton, Lexington, MA (US); Noah W. Kaufman, Cambridge, MA (US); Ashok Kumar, North Chelmsford, MA (US); Darren Raybourn, Marlboro, MA (US)

(73) Assignee: Metatomix, Inc., Waltham, MA (US)

( * ) Notice: Subject to any disclaimer, the term of this patent is extended or adjusted under 35 U.S.C. 154(b) by 914 days.

(21) Appl. No.: 11/064,438

(22) Filed: Feb. 23, 2005
(Under 37 CFR 1.47)

(65) Prior Publication Data
US 2006/0271563 A1 Nov. 30, 2006

Related U.S. Application Data

(63) Continuation-in-part of application No. 11/029,164, filed on Jan. 4, 2005, now Pat. No. 7,640,239, which is a continuation of application No. 10/051,619, filed on Oct. 29, 2001, now Pat. No. 6,856,992, which is a continuation-in-part of application No. 09/917,264, filed on Jul. 27, 2001, now Pat. No. 7,058,637, application No. 11/064,438, which is a continuation-in-part of application No. 10/302,727, filed on Nov. 21, 2002, now Pat. No. 7,302,440, and a continuation-in-part of application No. 10/302,764, filed on Nov. 21, 2002, now Pat. No. 6,925,457, which is a continuation-in-part of application No. 09/917,264, filed on Jul. 27, 2001, now Pat. No. 7,058,637, and a continuation-in-part of application No. 10/051,619, filed on Oct. 29, 2001, now Pat. No. 6,856,992, application No. 11/064,438, which is a continuation-in-part of application No. 10/680,049, filed on Oct. 7, 2003, now Pat. No. 6,954,749, application No. 11/064,438, which is a continuation-in-part of application No. 10/886,515, filed on Jul. 7, 2004, application No. 11/064,438, which is a continuation-in-part of application No. 10/138,725, filed on May 3, 2002.

(60) Provisional application No. 60/324,037, filed on Sep. 21, 2001, provisional application No. 60/291,185, filed on May 15, 2001, provisional application No. 60/332,053, filed on Nov. 21, 2001, provisional application No. 60/332,219, filed on Nov. 21, 2001, provisional application No. 60/416,616, filed on Oct. 7, 2002, provisional application No. 60/485,200, filed on Jul. 7, 2003.

(51) Int. Cl.
*G06F 17/30* (2006.01)

(52) U.S. Cl. .................. 707/752; 707/753; 707/754; 707/756

(58) Field of Classification Search .................. None
See application file for complete search history.

(56) References Cited

U.S. PATENT DOCUMENTS 4,701,130 A  10/1987  Whitney et al.

(Continued)

FOREIGN PATENT DOCUMENTS

WO    WO 97/22096    6/1997

(Continued)

OTHER PUBLICATIONS

Berniers-Lee et al. RFC 2396: Uniform Resource Identifiers (URI): Generic Syntax (Aug. 1998) http://www.cs.tut.fi/.about.jkorpela/rfc/2396/full.html, 23 pages, downloaded on Feb. 20, 2003.

(Continued)

*Primary Examiner*—Baoquoc N To

(57) ABSTRACT

The invention provides apparatus, platforms and methods according to the invention provide a surveillance, monitoring and real-time events platform to (i) enable the integration and communication of information between government agencies and organizations specifically tasked with ensuring the security and safety of our nation and its communities, (ii) to integrate information systems from federal, state and/or local agencies (from disparate data sources if necessary) in order to obtain a single, real-time view of the entire organization, and (iii) to extract more complete, actionable information from their existing systems, thereby dramatically improving decision making speed and accuracy.

30 Claims, 20 Drawing Sheets

U.S. PATENT DOCUMENTS

| | | |
|---|---|---|
| 4,895,518 A | 1/1990 | Arnold et al. |
| 4,953,106 A | 8/1990 | Gansner |
| 5,119,465 A | 6/1992 | Jack et al. |
| 5,129,043 A | 7/1992 | Yue |
| 5,199,068 A | 3/1993 | Cox |
| 5,259,766 A | 11/1993 | Sack et al. |
| 5,267,865 A | 12/1993 | Lee et al. |
| 5,270,920 A | 12/1993 | Pearse et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson |
| 5,374,932 A | 12/1994 | Wyschogrod |
| 5,379,387 A | 1/1995 | Carlstedt |
| 5,381,332 A | 1/1995 | Wood |
| 5,395,243 A | 3/1995 | Lubin et al. |
| 5,421,730 A | 6/1995 | Lasker, III et al. |
| 5,450,480 A | 9/1995 | Man |
| 5,463,682 A | 10/1995 | Fisher |
| 5,499,293 A | 3/1996 | Behram et al. |
| 5,519,618 A | 5/1996 | Kastner |
| 5,548,506 A | 8/1996 | Srinivasan |
| 5,579,486 A | 11/1996 | Oprescu |
| 5,597,312 A | 1/1997 | Bloom et al. |
| 5,608,789 A | 3/1997 | Fisher |
| 5,655,118 A | 8/1997 | Heindel et al. |
| 5,732,192 A | 3/1998 | Malin |
| 5,745,753 A | 4/1998 | Mosher, Jr. |
| 5,761,063 A | 6/1998 | Jannette et al. |
| 5,765,140 A | 6/1998 | Knudson et al. |
| 5,788,504 A | 8/1998 | Rice et al. |
| 5,795,155 A | 8/1998 | Morrel-Samuels |
| 5,809,212 A | 9/1998 | Shasha |
| 5,822,780 A | 10/1998 | Schutzman |
| 5,826,077 A | 10/1998 | Blakeley et al. |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi |
| 5,873,076 A | 2/1999 | Barr et al. |
| 5,875,441 A | 2/1999 | Nakatsuyama et al. |
| 5,881,269 A | 3/1999 | Dobbelstein |
| 5,907,837 A | 5/1999 | Ferrel et al. |
| 5,935,249 A | 8/1999 | Stern et al. |
| 5,974,441 A | 10/1999 | Rogers et al. |
| 5,974,443 A | 10/1999 | Jeske |
| 5,983,267 A | 11/1999 | Shklar et al. |
| 5,987,415 A | 11/1999 | Breese |
| 5,995,958 A | 11/1999 | Xu |
| 6,012,098 A | 1/2000 | Bayeh et al. |
| 6,035,412 A | 3/2000 | Tamer et al. |
| 6,044,373 A | 3/2000 | Gladney et al. |
| 6,044,466 A | 3/2000 | Anand |
| 6,078,982 A | 6/2000 | Du et al. |
| 6,085,188 A | 7/2000 | Bachmann et al. |
| 6,094,652 A | 7/2000 | Faisal |
| 6,122,632 A | 9/2000 | Botts et al. |
| 6,125,363 A | 9/2000 | Buzzeo et al. |
| 6,130,679 A | 10/2000 | Chen |
| 6,137,797 A | 10/2000 | Bass et al. |
| 6,144,997 A | 11/2000 | Lamming et al. |
| 6,151,595 A | 11/2000 | Pirolli |
| 6,151,624 A | 11/2000 | Teare |
| 6,154,738 A | 11/2000 | Call |
| 6,177,932 B1 | 1/2001 | Galdes et al. |
| 6,182,085 B1 | 1/2001 | Eichstaedt et al. |
| 6,185,516 B1 | 2/2001 | Hardin |
| 6,185,534 B1 | 2/2001 | Breese |
| 6,212,502 B1 | 4/2001 | Ball |
| 6,240,417 B1 | 5/2001 | Eastwick et al. |
| 6,243,713 B1 | 6/2001 | Nelson et al. |
| 6,246,320 B1 | 6/2001 | Monroe |
| 6,266,668 B1 | 7/2001 | Vanderveldt et al. |
| 6,308,163 B1 | 10/2001 | Du et al. |
| 6,330,554 B1 | 12/2001 | Altschuler et al. |
| 6,341,277 B1 | 1/2002 | Coden et al. |
| 6,360,330 B1 | 3/2002 | Mutalik et al. |
| 6,369,819 B1 | 4/2002 | Pitkow |
| 6,381,738 B1 | 4/2002 | Choi |
| 6,389,429 B1 | 5/2002 | Kane et al. |
| 6,389,460 B1 | 5/2002 | Stewart et al. |
| 6,393,423 B1 | 5/2002 | Goedken |
| 6,405,211 B1 | 6/2002 | Sokol et al. |
| 6,405,251 B1 | 6/2002 | Bullard |
| 6,415,283 B1 | 7/2002 | Conklin |
| 6,418,413 B2 | 7/2002 | DeMarcken et al. |
| 6,418,448 B1 | 7/2002 | Sarkar |
| 6,427,151 B1 | 7/2002 | Chan et al. |
| 6,429,870 B1 | 8/2002 | Chen |
| 6,437,799 B1 | 8/2002 | Shinomi |
| 6,446,200 B1 | 9/2002 | Ball |
| 6,446,256 B1 | 9/2002 | Hyman et al. |
| 6,463,440 B1 | 10/2002 | Hind et al. |
| 6,496,833 B1 | 12/2002 | Goldberg et al. |
| 6,509,898 B2 | 1/2003 | Chi |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | Derose et al. |
| 6,556,983 B1 | 4/2003 | Altschuler et al. |
| 6,571,222 B1 | 5/2003 | Matsumoto et al. |
| 6,577,769 B1 | 6/2003 | Kenyon |
| 6,583,800 B1 | 6/2003 | Ridgley |
| 6,594,662 B1 | 7/2003 | Sieffert et al. |
| 6,598,043 B1 | 7/2003 | Baclawski |
| 6,606,613 B1 | 8/2003 | Altschuler |
| 6,625,657 B1 | 9/2003 | Bullard |
| 6,636,848 B1 | 10/2003 | Aridor et al. |
| 6,640,284 B1 | 10/2003 | Shaw et al. |
| 6,643,638 B1 | 11/2003 | Xu |
| 6,643,652 B2 | 11/2003 | Hekgeson et al. |
| 6,678,679 B1 | 1/2004 | Bradford |
| 6,701,314 B1 | 3/2004 | Conover et al. |
| 6,721,747 B2 | 4/2004 | Lipkin |
| 6,725,227 B1 | 4/2004 | Li |
| 6,751,663 B1 | 6/2004 | Farrell |
| 6,757,708 B1 | 6/2004 | Craig et al. |
| 6,772,148 B2 | 8/2004 | Baclawski |
| 6,778,971 B1 | 8/2004 | Altschuler |
| 6,792,420 B2 | 9/2004 | Chen et al. |
| 6,804,688 B2 | 10/2004 | Kobayashi et al. |
| 6,901,438 B1 | 5/2005 | Davis et al. |
| 6,925,457 B2 | 8/2005 | Britton et al. |
| 6,934,702 B2 | 8/2005 | Faybishenko et al. |
| 7,047,411 B1 | 5/2006 | DeMello et al. |
| 7,117,260 B2 | 10/2006 | Bimson et al. |
| 7,171,415 B2 | 1/2007 | Kan et al. |
| 7,289,793 B2 * | 10/2007 | Norwood et al. ......... 455/414.1 |
| 7,313,588 B1 | 12/2007 | Shotton, Jr. et al. |
| 2001/0047355 A1 | 11/2001 | Anwar |
| 2002/0049603 A1 | 4/2002 | Mehra et al. |
| 2002/0049788 A1 | 4/2002 | Lipkin et al. |
| 2002/0059566 A1 | 5/2002 | Delcambre et al. |
| 2002/0069134 A1 | 6/2002 | Solomon |
| 2002/0078030 A1 | 6/2002 | Iwayama et al. |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0118688 A1 | 8/2002 | Jagannathan |
| 2002/0120598 A1 | 8/2002 | Shadmon et al. |
| 2002/0133502 A1 | 9/2002 | Rosenthal et al. |

| | | | |
|---|---|---|---|
| 2002/0143759 | A1 | 10/2002 | Yu |
| 2002/0178232 | A1 | 11/2002 | Ferguson |
| 2003/0004934 | A1* | 1/2003 | Qian .............................. 707/3 |
| 2003/0050834 | A1 | 3/2003 | Caplan |
| 2003/0050927 | A1 | 3/2003 | Hussam |
| 2003/0050929 | A1 | 3/2003 | Bookman et al. |
| 2003/0061209 | A1 | 3/2003 | Raboczi et al. |
| 2003/0074352 | A1 | 4/2003 | Raboczi et al. |
| 2003/0074369 | A1 | 4/2003 | Schuetze et al. |
| 2003/0088639 | A1 | 5/2003 | Lentini et al. |
| 2003/0109951 | A1 | 6/2003 | Hsiung et al. |
| 2003/0229529 | A1 | 12/2003 | Mui et al. |
| 2004/0034651 | A1 | 2/2004 | Gupta et al. |
| 2004/0054690 | A1* | 3/2004 | Hillerbrand et al. ...... 707/104.1 |
| 2005/0055330 | A1 | 3/2005 | Britton et al. |
| 2005/0060372 | A1* | 3/2005 | DeBettencourt et al. .... 709/206 |
| 2005/0125683 | A1* | 6/2005 | Matsuyama et al. ......... 713/189 |
| 2006/0271563 | A1 | 11/2006 | Angelo et al. |

FOREIGN PATENT DOCUMENTS

| | | |
|---|---|---|
| WO | WO 98/05018 | 2/1998 |
| WO | WO 98/10399 | 3/1998 |
| WO | WO 98/24020 | 6/1998 |
| WO | WO 99/27460 | 6/1999 |

PUBLICATIONS

Forgy, Charles L. "Rete: A Fast Algorithm for the Many Pattern/Many Object Pattern Match Problem," Artifical Intelligence vol. 19 (1982) pp. 17-37.

Melnik, Sergey, "Storing RDF in a relational database," http://www-db.stanford.edu/.about.melnik/rdf/db.html, 5 pages, downloaded on 20/20/2003.

Quinlan, J. R., "Induction of Decision Trees," Machine Learning vol. 1 (1986) pp. 18-106.

Resource Description Framework (RDF) Model and Syntax Specification W3C Recommendation (Feb. 22, 1999) http://www.w3.org.TR/1999/REC-rdf-syntax-19990222/, 34 pages, downloaded on Feb. 20, 2003.

"The Rete Algorithm," http://herzberg.ca.sandia.gov/jess/docs/52/rete.html, 3 pages, downloaded on Feb. 20, 2003.

"Inkling: RDF Query Using SquishQL," downloaded from http://swordfish.rdfweb.org/rdfquery/ on Mar. 20, 2003, 2 pages.

"rdfDB Query Language," downloaded from http://www.guha.com/rdfdb/query.html on Mar. 20, 2003, 4 pages.

"RDQL—RDF Data Query Language," Hewlett-Packard Company, .COPYRGT. 1994-2003, downloaded from http://www.hpl.hp.com/semweb/rdql.htm on Mar. 20, 2003, 3 pages.

Card et al., "Readings in Information Visulaizing Using Vision to Think", 1999, Morgan Kaufmann, p. 298.

"The Surveillance and Monitoring Component of the Public Health Information Network", website for the Centers for Disease Control and Prevention, http://www.cdc.gov/nedss, printed Nov. 14, 2005, 2 pages.

"An Overview of the NEDSS Initiative", website for the Centers for Disease Control and Prevention, http://www.cdc.gov/nedss/About/overview.html, printed Nov. 14, 2005, 2 pages.

"Background on Public Health Surveillance", website for the Centers for Disease Control and Prevention, http://www.cdc.gov/nedss/About/purpose.htm, printed Nov. 14, 2005, 3 pages.

"Description of the NEDSS Base System," Mar. 28, 2001, 5 pages.

"NEDSS Base System Fact Sheet", website for the Centers for Disease Control and Prevention, 2 pages.

"NEDSS Logical Data Model (NLDM) Overview and Users' Guide", Version 1.0, 92 pages.

"NEDSS Systems Architecture", Version 2.0, Apr. 15, 2001, 5 pages.

"NEDSS and NEDSS PAMs Business Discovery Statement", Version 1.2, Mar. 9, 2002, 23 pages.

"Overview of PHIN", Centers for Disease Control and Prevention website, http://www.cdc.gov/phin, printed Jan. 18, 2005, 3 pages.

"Public Health Information Network", The Association of State and Territorial Health Officials website, http://www.astho.org/?template=public_health_info_network.html, printed Jan. 18, 2005, 2 pages.

"Maestro™ Public Health Suite," Orion International website, http://www.orionhealth.com/maestro_overview.htm, printed Jan. 18, 2005, 3 pages.

Published International Search Report (published May 24, 2007) and Written Opinion (mailed Feb. 12, 2007) for PCT/US05/005725.

Robert Churchill et al., "RDF Technical Overview," Mozilla.org. Last Modified Nov. 1999. Retrieved from: http://www.mozilla.org/rdf/doc/api.html.

Dan Brickley and Libby Miller, "RDF, squish etc.", Pub. on the Web, Nov. 6, 2000., retrieved from: http://www.itrt.bris.ac.uk/discovery/2000/11/QL/QL.tx.

Dan Brickley et al., "SWIPE 0.1 specification", Pub. 2001, retrieved from: http://rdfweb.org/2001/01/swipe.

David Beckett, "The Design and Implementation of the Redland RDF Application Framework", Copyright WWWO1 May 2-5, 2001, retrieved from: http://www10.org/cdrom/papers/490.

Sergey Melnik et al., "Representing Order in RDF. Pub. Jan. 7, 2001", Retrieved from: http://infolab.stanford.edu/~stefan/daml/order.htm.

Mathew Gray, "HIVE Semantic Labeling.", May 14, 1999, Retrieved from: http://hive.sourceforge.net/mkgray-thesis/html/node8.html.

Libby Miller, "Aggregating Recommendations using RDF. ILRT", Org. Pub. Jan. 10, 1999.

Larry Kerschberg, "Knowledge Management in Heterogeneous Data Warehouse Environment", Pub. 2001.

Gregory Karvounarakis et al., "Querying Community Web Portals", Sigmod Pub, Pub. 2000.

Bernd Amann et al., Integrating ontologies and thesauri for RDF schema creation and metadata querying, Mar. 6, 2001.

"Resource Description Framework (RDF) Model and Syntax Specification", W3C Recommendation, Feb. 22, 1999.

Supplemental European Search Report dated Aug. 21, 2007 (5 pages).

Miller, Eric et al., RDF Primer, W3C @@ Editor's Draft 27 Jan. 2002 @@, Copyright 2001, 2002 (MIT,INRIA, Keio) (22 pages).

Six, Janet, M. et al, "Effective eGraph Visualization Via Node Grouping", Proceedings of the IEEE Symposium on Information Visualization 2001 (INFOVIS'01) (8 pages).

Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. on Practical Aspects of Knowledge Management (PAKM2000) Basel, Swwitzerland, Oct. 30-31, 2000, (U.Reimer, ed.).

Kerstin Forsberg et al. Extensible use of RDF in a business context. Computer Networks 33 (2000), pp. 347-364: The International Journal of Computer and Telecommunications Networking . Published Jun. 2000.

S. Alexaki et al. Managing RDF Metadata for Community Webs. Springer Berlin / Heidelberg. vol. 1921/2000, pp. 140-151.

Terence Critchlow. Report on XEWA-00: the XML enabled wide-area searches for bioinformatics workshop. ACM> vol. 30 , Issue 1 (Mar. 2001).

Semantic Web Workshop 2001. Proceedings of the Second International Workshop on the Semantic Web. SemWeb'2001. S. Staab et al. Hong Kong, China, May 2001.

M. R. Kogalovsky, Systematization of information resources collections in digital libraries. MAIK Nauka/Interperiodica distributed exclusively by Springer Science+Business Media LLC. vol. 26, No. 3 / May 2000, pp. 140-155.

Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 2, 2001-Apr. 6, 2001.

Aug. 1, 2008, Office Action of U.S. Appl. No. 10/886,515.

Aug. 29, 2008, Office Action for U.S. Appl. No. 11/245,994.

Office Action from US Patent and Trademark Office for U.S. Appl. No. 10/886,515, mailed Nov. 1, 2007.

Office Action from US Patent and Trademark Office for U.S. Appl. No. 10/886,515, mailed Mar. 12, 2007.

Office Action from US Patent and Trademark Office for U.S. Appl. No. 11/245,994, mailed Dec. 12, 2007.
Thompson, Craig "Workshop on Compositional Software Architectures Workshop Report," Software Engineering Notes, vol. 23. No. 3, May 1998.
Takeda, Koichi, "Site Outlining," IBM Research, Tokyo Research Lab, 1623-14.
Bucher, Alex et al. "Discovering Internet Marketing Intelligence through Online Analytical Web Usage Mining," SIGMOD Record, vol. 27, No. 4, Dec. 1998.
Ouksel, Aris et al. "Semantic Interoperability in Global Information Systems," SIGMOD Record, vol. 28, No. 1, Mar. 1999.
Sycara, Katia et al. "Dynamic Service Matchmaking Among Agents in Open Information," SIGMOD Record, vol. 28, No. 1, Mar. 1999.
Buneman et al "Interaction between Path and Type Constraints" PODS 1999.
Swick, Ralph, "RDF:Weaving the Web of Discovery," Putting it Together, Jun. 1999.
Suciu, Dan "Managing Web Data," AT&T Labs-Research, SIGMOD 1999.
Crestani, Fabio "Vocal Access to a Newspaper Archive: Design Issues and Preliminary Investigations," International Computer Science Institute.
McGrath et al, "Digital Library Technology for Locating and Accessing Scientific Data," DL99 Berkeley ACM 1999.
Thomas Lee, et al "Information integration with attribution support for corporate profiles," CIKM99, Nov. 1999 ACM 99.
Tudhope et al "Semantically Indexed Hypermedia: Linking Information Disciplines," ACM 2000, www.comp.glam.ac.uk/people/staff/dstudhope.
Bonifati, "Comparative Analysis of Five XML Query Languages," SIGMOD Record, vol. 29, No. 1, Mar. 2000.
Carr, Leslie et al. "The Evolution of Hypertext Link Services," ACM 2000 0360/99/12es.
Fan, W enfei, "Integrity Constraints for XML," ACM 2001 1-58113-218-x/00/05.
Chen, James et al "A Distributed Multi-Agent System for Collaborative Information Management and Sharing," RBAC 2000, Berlin, Germany ISBN 1-58113-259-x/00107.
Melnik, Sergey "A Mediation Infrastructure for Digital Library Services," Digital Libraries, San Antonio, TX ACM 2000 -581 13-231 x/00/0006.
Melnik, Sergey "Building a Distributed Full-Text Index of the Web," WWW10, May 1-5, 2001, Hong Kong ACM 1-58113-348-0/01/00005.
Semantic Web Workshop: Models, Architectures and Management, Sep. 21, 2000 Conference Review, Intelligence Summer 2001.
Brickley, Dan "Semantic Web History: Nodes and Arcs 1989-1999," The WWW Proposal and RDF, revised Mar. 2001 http:www.w3.org/1999/11/11-WWWProposal/.
Halpin, Harry et al "W3C Semantic Web Activity," W3C Sematic Web, http://www.w3.org/2001/sw/.
Prudhommeaux, Eric "Check and Visualize you RDF," W3C website, Feb. 15, 2007, http://www.w3.org/RDF/Validator/.
RDF Interest Group 1999-2004, W3C Sematic Web, http://www.w3.org/RDF/Interest/.
Berners-Lee, Tim "Information Management: A Proposal," Mar. 1989, May 1990.
Beckett, Dave Dave Beckett's Resource Description Framework (RDF) Resource Guide, available at http://planetrdf.com/guide, last updated Sep. 23, 2005, 26 pages.
Brickley, Dan "RDF Query in Javascript demo," W3C website, Jul. 28, 2001, http://www.w3.org/1999/11/11-WWWProposal/rdfqdemo.html.
Extensible Markup Language (XML), W3C Sematic Web, http://www.w3.org/XML.
Berniers-Lee et al, "The Enquire Manual," Oct. 1980, http://infomesh.net/2001/enquire/manual/.
Dublin Core Metadata Initiative, available at http://dublincore.org, web page last updated Mar. 31 2009, 1 page.
Resource Description Framework, (RDF) Schema Specification, W3C Proposed Recommendation Mar. 3, 1999, http://www.w3.org/TR/1999/PR-rdf-schema-19990303/.
Berners-Lee et al "Web Architecture: Describing and Exchanging Data," W3C Recommendations, Jun. 7, 1999, http://www.w3.org/1999/06/07-WebData.
Berners-Lee, "Semantic Web Road Map," W3C Recommendations, Sep. 1998, http://www.w3.org/DesignIssues/Semantic.html.
Lassila, et al "Resource Description Framework (RDF) Model and Syntax Specification," W3C Recommendations, Feb. 22, 1999.
Berners-Lee, "What a semantic web can represent," W3C Recommendations, Sep. 1998, http://www.w3.org/DesignIssues/RDFnot.html (3 of 8)Sep. 27, 2004 1:30:09 am.
Fensel, D. "Ontobroker: Or How to Enable Intelligent Access to the WWW," Proceedings of the 11th Banff Knowledge Acquisition for Knowledge-Based System Workshop (KAW98), Banaff, Kanada, Apr. 1998.
Swick, R. "The Cambridge Communique," W3C Recommendations, Oct. 1999, http://www.w3.org/TR/schema-arch.
Technical Reports and Communications, W3C website, Apr. 17, 2009, http://www.w3.org/TR/.
Bray, Tim et al. "Extensible Markup Language," W3C Recommendations, Feb. 10, 1998, http://www.w3.org/TR/1998/REC-xml-19980210.
Cowan, John et al. "XML Information Set," W3C Recommendations, May 17, 1999, http://www.w3.org/TR/1999/WD-xml-infoset-19990517.
Extensible Markup Language Activity Statement, W3C Ubiquitous Web, http://www.w3.org/XML/Activity#core-wg.
Clark, James Editor "XSL Transformations," W3C Recommendations, Nov. 16, 1999, http://www.w3.org/TR/xsIt.
Manola, Frank Editor "RDF Primer," W3C Working Draft, Mar. 2002, http://www.w3.org/TR/2002/WD-rdf-primer-20020319/.
Malhotra, Ashok et al., "XML Schema Requirements," W3C Note, Feb. 15, 1999, http://www.w3.org/TR/NOTE-xml-schema-req.
United States Patent and Trademark Office final Office Action for U.S. Appl. No. 10/886,515 mailed May 1, 2009.
Shankar, Ravi D. et al., "Epoch: an Ontological Framework to Support Clinical Trials Management", [1]Stanford Medical Informatics, Stanford University School of Medicine, Stanford, CA, USA, [2]The Immune Tolerance Network, Pittsburgh, PA, USA, pp. 25-32, Nov. 11, 2006, Copyright 2006.
U.S. Office Action for U.S. Appl. No. 10/886,515, dated Oct. 27, 2009.

* cited by examiner

Figure 13

CMS Summary Data Card

Select Report: [CMS Summary Data Card ▼]

Total Selected Period

| Measure/Condition | Provider | Electronic Record Documents Measure Compliance | Electronic Record Does Not Document Measure Compliance | Coded Identifier For Records That Do Not Document Compliance |
|---|---|---|---|---|
| AMI ASPIRIN_TABLETS_USP Ordered | Provider 2 | 20 | 36 | ID #1270<br>ID #1292<br>ID #1305 |
| | Provider 3 | 20 | 53 | ID #1200<br>ID #1282<br>ID #1284 |
| | All Providers | 46 | 89 | |
| AMI ATENOLOL_TABLETS_USP Ordered | Provider 2 | 9 | 53 | ID #1193<br>ID #1190<br>ID #1193 |
| | Provider 3 | 23 | 50 | ID #1195<br>ID #1197<br>ID #1200 |
| | All Providers | 32 | 103 | |
| AMI CAPTOPRIL_TABLETS_USP Ordered | Provider 2 | 27 | 35 | ID #1193<br>ID #1190<br>ID #1193 |
| | Provider 3 | 30 | 45 | ID #1195<br>ID #1197<br>ID #1200 |
| | All Providers | 57 | 78 | |
| Pneumonia AMIKACIN_SULFATE_INJECTION Ordered | Provider 2 | 14 | 10 | ID #1021<br>ID #1023<br>ID #1025 |
| | Provider 3 | 13 | 17 | ID #1024 |

PROVIDERS
☐ Provider 1
☑ Provider 2 — 1402
☑ Provider 3
REPORTING PERIOD — 1404
Year To Date

APPLIANCE FOR ENTERPRISE INFORMATION INTEGRATION AND ENTERPRISE RESOURCE INTEROPERABILITY PLATFORM AND METHODS

This application claims the benefit of priority of U.S. Provisional Patent Application Ser. No. 60/601,312, filed Aug. 13, 2004, entitled "Appliance For Enterprise Information Integration And Enterprise Resource Interoperability Platform And Methods," and U.S. Patent Application Ser. No. 60/547,167, filed Feb. 23, 2004, entitled, "Enterprise Information Integration and Enterprise Resource Interoperability Platform and Methods".

This application is a continuation-in-part of U.S. patent application Ser. No. 11/029,164, filed Jan. 4, 2005, now U.S. Pat. No. 7,640,239 entitled "Methods And Apparatus For Real-Time Business Visibility Using Persistent Schema-Less Data Storage," which is a continuation of U.S. patent application Ser. No. 10/051,619, filed Oct. 29, 2001 (corresponding to WO02093410, published Nov. 21, 2002 and now issued as U.S. Pat. No. 6,856,992), entitled "Methods And Apparatus For Real-Time Business Visibility Using Persistent Schema-Less Data Storage," which claims priority to U.S. Provisional Patent Application Ser. No. 60/324,037, filed Sep. 21, 2001, entitled "Methods And Apparatus For Real-Time Business Visibility Using Persistent Schema-Less Data Storage," and which is a continuation-in-part of U.S. patent application Ser. No. 09/917,264, filed Jul. 27, 2001, now U.S. Pat. No. 7,058,637 entitled "Methods and Apparatus for Enterprise Application Integration" (corresponding to WO02093319, published Nov. 21, 2002), which claims priority to U.S. Provisional Patent Application Ser. No. 60/291,185, filed May 15, 2001, entitled "Methods And Apparatus For Enterprise Application Integration".

This application is a continuation-in-part of U.S. patent application Ser. No. 10/302,727, filed Nov. 21, 2002, entitled "Methods and Apparatus for Statistical Data Analysis and Reduction for an Enterprise Application" (corresponding to PCT Application WO03046769, published Jun. 5, 2003 and now issued as U.S. Pat. No. 7,302,440) and U.S. patent application Ser. No. 10/302,764, filed Nov. 21, 2002, entitled "Methods and Apparatus for Querying a Relational Data Store Using Schema-Less Queries" (corresponding to PCT Application WO03044634, published May 30, 2003, and now issued as U.S. Pat. No. 6,925,457), both of which are Continuation-in-parts of U.S. patent application Ser. No. 09/917,264, filed Jul. 27, 2001, entitled "Methods and Apparatus for Enterprise Application Integration" (corresponding to WO02093319, published Nov. 21, 2002 and now issued as U.S. Pat. No. 7,058,637) and U.S. patent application Ser. No. 10/051,619, filed Oct. 29, 2001, now U.S. Pat. No. 6,856,992 entitled "Methods And Apparatus For Real-Time Business Visibility Using Persistent Schema-Less Data Storage" (corresponding to WO02093410, published Nov. 21, 2002), and which claim priority to U.S. Provisional Patent Application Ser. No. 60/332,053, filed Nov. 21, 2001, entitled "Methods And Apparatus For Querying A Relational Data-base Of RDF Triples In A System For Real-Time Business Visibility" and U.S. Provisional Patent Application Ser. No. 60/332,219, filed Nov. 21, 2001, entitled "Methods And Apparatus For Calculation And Reduction Of Time-Series Metrics From Event Streams Or Legacy Databases In A System For Real-Time Business Visibility".

This application is a continuation-in-part of U.S. patent application Ser. No. 10/680,049, filed Oct. 7, 2003, entitled "Methods and Apparatus for Identifying Related Nodes in a Directed Graph Having Named Arcs," (corresponding to PCT Application WO2004034625, published Apr. 22, 2004, and now issued as U.S. Pat. No. 6,954,749) which claims the priority of U.S. Provisional Patent Application Ser. No. 60/416,616, filed Oct. 7, 2002, entitled "Methods And Apparatus For Identifying Related Nodes In A Directed Graph Having Named Arcs".

This application is a continuation-in-part of U.S. patent application Ser. No. 10/886,515, filed Jul. 7, 2004, entitled "Surveillance, Monitoring And Real-Time Events Platform," (corresponding to PCT Application U.S. Ser. No. 04/21671, filed Jul. 7, 2004and now published as US 2005/005330), which claims the priority of U.S. Provisional Patent Application Ser. No. 60/485,200, filed Jul. 7, 2003, entitled "Surveillance, Monitoring And Real-Time Events Platform".

This application is a continuation-in-part of U.S. patent application Ser. No. 10/138,725, filed May 3, 2002, entitled "Methods and Apparatus for Visualizing Relationships Among Triples of Resource Description Framework (RDF) Data Sets" (corresponding to PCT Application WO03094142, published Nov. 13, 2003, and now published as U.S. Patent Publication No. 2003/0208499).

BACKGROUND OF THE INVENTION

The teachings of all of the foregoing application and patents are incorporated herein by reference. The invention pertains to digital data processing and, specifically, to apparatus providing platforms and methods for enterprise information integration (EII) and enterprise resource interoperability (ERI), and methods of using those apparatus for that purpose. The invention has application in public health & bioterrorism, border and port security, public and community safety, and (state and local) government data integration, the travel & transportation industry, and the financial services industry, to name a few.

The reality today is that information technology is best characterized as a constellation of "system clusters." Each of these clusters—sometimes called "stovepipes"—contains multiple applications, databases, servers, storage devices, and network infrastructure. Each is typically allocated to a specific business unit, cost center, or division—that is, a cluster is bought and paid for out of a specific budget and its resources are devoted to a specific business function (e.g., finance has its own systems and manufacturing has its own separate systems). The result has been a perennial, intractable set of problems:

Data Stovepipes—Aggregating data from the various stovepipes is often virtually impossible. Gartner, Inc. estimates that 70 percent of corporate data resources are hosted on various mainframe systems. Butler Group found that 80 percent of corporate data is in non-relational data sources, while IDC's research shows that 40 percent of all application development effort is devoted simply to accessing existing data. What's more, Gartner also found that for every dollar spent on e-commerce implementation, somewhere between $5-$20 must be spent developing necessary integration systems.

Conflicting Standards—It has been said many times, the great thing about IT standards is that there are so many to choose from. But those standards often compete and are a significant barrier to integrating applications and data. Whether it's Linux vs. Windows 2000, Oracle vs. SQL Server, PeopleSoft vs. SAP, or structured vs. unstructured data, enterprises must support a wide variety of incompatible standards and protocols, representing a substantial hidden cost to the enterprise.

Real-Time Visibility—Even if you get the data out from its sources in a usable format, it's often too late to be of value. Enterprises want real-time visibility into their information.

Disruptive Changes—Given the critical nature of most of these systems, corporate IT is loathe to introduce any changes that could trigger business-halting system instabilities.

As a result of these problems, technology infrastructure deployments have tended to be primarily "point solutions" rather than more useful, enterprise-wide implementations that provide a more cohesive, universal view of the business.

Today, the infrastructure for enterprise computing continues to evolve, mature, and expand at spectacular rates. The general increase in computing performance and capacity—as well as the rapidly declining costs—play directly to our advantage. Consider the trend lines of the major infrastructure components:

Processing Power—Moore's law that establishes processor power and number of transistors doubles every 18 months continues to be proven true. We've gone from CPUs with 1,000 transistors to CPUs with 100 million transistors in a little more than 30 years—all while prices (in absolute and relative terms) have continued to decline dramatically. Memory speeds, capacities, and associated prices have seen similar adoption curves. Further, the miniaturization of these components has spawned unprecedented innovation in device sizes, form factors, and usage—as well as a surfeit of spare CPU cycles that are often untapped and idle.

Bandwidth—The cost-curve for network bandwidth continues to drop into a deep trough. Massive infrastructure investments during the "Internet boom" and by telecomm companies in the past several years have created an unprecedented glut in capacity, driving costs down significantly. Analysts believe that as little as 8 percent of deployed fiber optic lines are "lit" and that only two percent of that capacity is being utilized. The result: historically low prices.

Storage—In the storage sector, the adoption and cost curves are similar to those described by Moore's Law for microprocessors. Whether its disk- or chip-based persistent memory, storage capacities continue to climb while costs and form factors continue to shrink. Recently, manufacturers began showing prototypes of a hard-disk drive the size of a coin that can store 3 GB of data.

The "Next-Generation World Wide Web"—In only a few years, the Web has witnessed a remarkable evolution from a simple communications forum for scientists and academics to a rich source of information and research to an interactive platform supporting e-commerce and other transactions. Today, Web applications have grown from simple static publishing to dynamic pages, transactional commerce sites and now, with the Semantic Web, interoperable, interconnected platforms upon which software and application providers are developing entirely new generations of innovative products and services—and standards-based systems will drive their interoperability. Open standards and protocols, open-source software, Service-Oriented Architectures (SOA), (including Web Services), and the Semantic Web, that uses the Resource Description Framework (RDF) to bring together disparate data sources, drive this.

Service-Oriented Architectures—The sharing of modularized components ("services") using standard interfaces has had a dramatic impact on enterprise applications. SOAs such as Web Services have helped simplify point-to-point integration. However, this use of Web Services only scratches the surface of its deeper potential to enable companies to assemble dynamic, agile business processes and IT systems that can respond easily to change. Analysts believe that SOA will be the dominant approach to distributed computing by 2006 and that 69 percent of the enterprise software market will be service-oriented by 2010, representing an overall market of $98 billion.

Grid Computing—Another major developing trend lies in the area of on-demand grid computing. Like the familiar electrical grid we rely on for near-ubiquitous electrical service, grid computing assembles all of an enterprise's available networked resources from servers down to desktop computers into a single, seamless, virtual resource of processing, network bandwidth, and storage capacity, and data library that is available to users on demand.

Computational Grid—When viewing grids as a collection of connected machines, they all contribute a combination of resources to the grid. The most common resource contributed to the traditional grid is that of computing cycles (or CPU horsepower). These resources are used to:

Run CPU-intensive applications across a grid, rather than on a single (or single set) of machines.

Run applications modules (assuming the application is designed to divide its work)

Run applications that need to run many times off different machines on the grid

Storage Grid (Storage Network Management)—In the case of storage grids, the machines on the grid provides some transparent and scalable quantity of storage for grid use. (It is safe to assume that some resources on a grid contribute to both computational grids as well as storage grids). The concept of storage is not limited to long-term storage (non-volatile storage), but also to cache storage available within any given machine or resource. Storage Grids provide the foundation for information-based grid computing found in data grids.

Data Grid—Data grids provide for applications to use data from anywhere (assuming the appropriate security permissions). A federated approach to data grids enables users to maintain full control of their own data and information systems while contributing data to data grid-based applications. One can view this as distributed data access. As realized by the inventors hereof, the largely unaddressed challenge here lies in creating the ability to not only access data from disparate and geographically distributed data systems, but to create information from that data in a single-unified view. And, as evident in the discussion below, grid computing applications in accord with the invention take on the requirements of EII in support of comprehensive information integration, aggregation and interaction.

The continuing improvements in cost, capacity, power, and size in these infrastructure elements have enabled enterprises to undertake ambitious computing initiatives that reach the farthest corners of their organization, and increasingly outside their four walls as well. As we know, however, this relatively inexpensive computing infrastructure has led to its own set of daunting challenges. The proliferation of disparate, isolated, physically distributed, and technologically incompatible databases and applications has created intractable problems and costs for enterprise IT professionals.

On another front, national, state, and local governments are challenged to achieve unprecedented levels of cooperation in and among agencies and organizations charged with protecting the safety of communities. Many of these organizations use either proprietary or incompatible technology infrastructures that need to be integrated in order to provide real-time, critical information for effective event monitoring and coordinated emergency response. Information must be shared instantaneously and among numerous entities to effectively identify and respond to a potential threat or emergency-related event.

Significant efforts are underway along these lines, for example, in the public health and bioterrorism arena. The Centers for Disease Control and Prevention (CDC) of the U.S. Department of Health and Human Services has launched several initiatives toward forming nation-wide networks of shared health-related information that, when fully implemented, will facilitate the rapid identification of, and response to, health and bioterrorism threats. The CDC plans the Health Alert Network (HAN), for example, to provide infrastructure supporting for distribution of health alerts, disease surveillance, and laboratory reporting. The Public Health Information Network (PHIN) is another CDC initiative that will provide detailed specifications for the acquisition, management, analysis and dissemination of health-related information, building upon the HAN and other CDC initiatives, such as the National Electronic Disease Surveillance System (NEDSS).

While these initiatives, and others like them in both health and non-health-related fields, define functional requirements and set standards for interoperability of the IT systems that hospitals, laboratories, government agencies and others will use in forming the nationwide networks, they do not solve the problem of finding data processing equipment capable of meeting those requirements and standards.

It is not uncommon for a single enterprise, such as a hospital, for example, to have several separate database systems to track medical records, patient biographical data, hospital bed utilization, vendors, and so forth. The same is true of the government agencies charged with monitoring local, state and national health. In each enterprise, different data processing systems might have been added at different times throughout the history of the enterprise and, therefore, represent differing generations of computer technology. Integration of these systems at the enterprise level is difficult enough; it would be impossible on any grander scale. This is a major impediment to surveillance, monitoring and real-time events processing in public health and bioterrorism. Similar issues result in parallel problems in border and port security, public and community safety, and government data integration, is the consolidation of data from disparate databases and other sources.

An object of this invention is to provide improved methods and platforms for enterprise information (EII) integration and enterprise resource interoperability (ERI).

A related object is to provide such methods and platforms as can be applied across a range of industries, from public health & bioterrorism, border and port security, public and community safety, and (state and local) government data integration, the travel & transportation industry, and the financial services industry, to name a few.

A further object of the invention is to provide apparatus for effecting ready installation and integration of the aforementioned methods and platforms in an enterprise.

SUMMARY OF THE INVENTION

Medical professionals have long used the terms "gray matter" and "white matter" to describe the differences in neurological functions in the brain and spinal column. Gray matter regions of the central nervous system, the brain, and spinal cord are the areas where the actual "processing" is performed.

By contrast, the white matter provides the communication among different gray matter areas and between the gray matter and the rest of the body. In essence, the gray matter is where the processing is done and the white matter is the channels of communication between the gray matter units. (Or, if you prefer more familiar computer terms, gray matter is like the individual systems that run within an enterprise and the white matter is the communication network that ties them together and leverages all the systems as if they were one.)

Drawing on this analogy, we've coined the phrase "White Matter Computing" as a term to describe the communications, collaboration, and coordination among various applications, information systems, and data stores. Virtually every Fortune 500 company wants to intelligently react, respond, adapt to, and process information instantly. They've invested extensively in the necessary gray matter—the enterprise applications and information systems and databases that currently makeup an enterprise IT infrastructure. What's missing: white matter computing platform to provide the communication and collaboration between gray matter applications and white matter applications.

This new concept of white matter computing dovetails neatly with the $5 billion grid computing market. Companies need ways to manage their IT resources as they lash together their vast collections of CPU horsepower to create computational grids and storage grids and even data grids. They also need to integrate in real time the distributed data stores that these computers process and store. "White matter computing" is all about creating and managing both the data and the IT resources used in the enterprise to manage that data.

Distributed EII—Building on the Foundation

As mentioned earlier, grid computing enables virtual organizations to share geographically dispersed resources as they pursue common goals. Tying together disparate hardware is an essential first step in grid computing. You want to leverage all available CPU cycles, memory, and storage to their fullest.

The inventors believe that Distributed Eli creates two distinct opportunities.

New Opportunity #1: Creating an "Enterprise Information Grid"

Operating at a higher, more strategic level, you need the ability to virtually integrate all relevant data from any system, application, or device—merely aggregating the data isn't enough. The self-evident value of combining computational grids and data grids provides a compelling tactical ROI that collectively reaches billions of dollars. However, the underlying strategic imperative is to integrate the disparate data managed by those grids—creating a higher-level information grid.

Information grids preserve and resolve the semantic distinctions among disparate sources of data and content. Whereas data grids merely provide universal access, an information grid unifies the information itself, while it remains across multiple, disparate information domains (such as applications, databases, infrastructure, and networks).

Creation of enterprise information grid services and the enablement of robust, policy-driven grid management capabilities are both dependent upon the successful marriage of real-time integration and powerful, semantically rich metadata modeling techniques.

Note that an enterprise information grid is conceptual, not physical. Therefore, it can be deployed with or without a physical grid infrastructure (i.e. computational grid, storage grid, or data grid).

New Opportunity #2: Enterprise Resource Integration

There are compelling opportunities to expand and enhance the capabilities of standard network management tools (e.g. Unicenter, OpenView). By using the views and interaction capabilities of distributed EII, network management tools can virtualize and optimize available computing resources. Simply put, IT can make use of distributed EII capabilities to enable the automation of its own core operational and control capabilities.

- Real-Time Grid Management
- Enterprise Asset Management
- Command/Control/Communication Services to run applications
- Policy-Based Decision Making
- Integration With Provisioning Tools Distributed EII Plateform for Information Grids and Enterprise Resource Management Building on the Semantic Web, Service-Oriented Architectures (SOA), and grid computing, apparatus, platforms and methods according to the invention are the solution that enables enterprises to leverage their entire distributed, technologically disparate data portfolios. Unlike inflexible and limited EAI, ETL, and other point-solutions that tactically string together applications, merely pump data between points, or require cumbersome manual integration methods, apparatus, platforms and methods according to the invention provide the only flexible platform that combines intelligent data aggregation, seamless information integration, and real-time mission-critical interaction—all driven by an integrated rules engine. The result of this new approach is less costly, faster information that provides actionable insights through the creation of vertically appropriate applications.

- Data Aggregation—apparatus, platforms and methods according to the invention use a non-invasive, Internet-based messaging-oriented infrastructure (using SOAP, WADL, UDDI, etc.) to quickly extract data from disparate sources (such as contemporary CRM, SFA applications and data warehouses, as well as legacy systems and data files), transform it into Resource Description Framework (RDF, an advanced for of XML), and create and automatically apply your customized business rules. This scalable, fault-tolerant solution requires only simple database connections—and no changes to existing gray matter applications or databases. It also conforms to the existing security and integrity of your existing information architecture. With apparatus, platforms and methods according to the invention, you can use and reuse high-level abstract components to quickly assemble and modify a large number of distributed "processing chains" that interconnect your gray matter applications.
- Information Integration—The ability to integrate disparate into meaningful information models provides the new class of white matter applications that provide enterprise knowledge through monitoring, analysis, and decision support. Apparatus, platforms and methods according to the invention leverage the Semantic Web in its own real-time, data cache—a platform-independent metadata repository that enables you to bring data together and analyze it for previously unseen patterns, commonalities, and relationships. Apparatus, platforms and methods according to the invention provides a persistent store of information objects where the data expressed is abstract from the way it is stored, enabling structured and unstructured data alike to be collected and combined.

And since it leverages your metadata (the "data about the data"), it enables you to aggregate and integrate information in ways not previously possible. Apparatus, platforms and methods according to the invention use the W3C's Resource Description Framework (RDF) standard—a model and syntax for representing metadata as part of the global information model. That enables apparatus, platforms and methods according to the invention to accommodate data in any form: structured, semi-structured, or unstructured.

- Real-Time Interaction—apparatus, platforms and methods according to the invention deliver dynamic, real-time, interactive "composite applications" that monitor and report on real-time data from disparate sources. The customizable business-insight dashboard provides the single view of real-time information and a level of two-way interactivity never before possible.

Technology Advantages:

- Improved Resource Utilization—Studies show that the average corporate server uses only 20 percent of its full capacity. Apparatus, platforms and methods according to the invention enable IT departments to harness and marshal their resources to optimally manage a unified, seamless computing resource.
- Next-Generation XML Metadata-Driven Design—Apparatus, platforms and methods according to the invention eliminate the constraints of traditional relational-based data modeling, the dynamic, simple-schema data model offers the first and best commercial implementation of the W3C's standard Resource Description Framework (RDF) standard.
- BPA Rules Engine—Apparatus, platforms and methods according to the invention automate your responses and decisions—and acts on complex situations without the overhead of code embedded in multiple gray matter applications. Apparatus, platforms and methods according to the invention reduce implementation and management costs through a powerful inference engine that eliminates the need to code for fact/rule interpretations.
- Flexibility—You can dynamically add or delete data sources, query the platform's data cache, or deploy in a distributed architecture.
- Unprecedented Openness—With apparatus, platforms and methods according to the invention, you're not tied to any vendor's DBMS, file system, application, operating system, or other protocol or standard. XML metadata gives you a very low-cost data provisioning, access, and integration.
- Scalability—Apparatus, platforms and methods according to the invention offers scalability proven in numerous deployments. As your future needs dictate, you can deploy additional solutions based on apparatus, platforms and methods according to the invention, at minimal incremental cost.
- Low-Impact Implementation—Apparatus, platforms and methods according to the invention are a non-invasive solution that requires no changes to your databases or applications. Security within your architecture remains intact. And you can deploy multiple configurations customized to meet varying security and infrastructure needs.
- Rapid Deployment—Apparatus, platforms and methods according to the invention deliver actionable insights very quickly.

Business Advantages

Achieve Real-Time Visibility Across The Enterprise—Apparatus, platforms and methods according to the invention help business analysts and managers find commonalities, trends, and patterns in aggregated data to provide new insights in ways that have never before been possible—all in real-time as dictated by the business's unique needs.

Breakthrough Services—Apparatus, platforms and methods according to the invention enable a new-breed white matter applications that differentiate your enterprise in the eyes of customers. Collectively, these bring in new customers, improve service, keep you ahead of competitors, decrease customer churn, and increase revenue-per-customer.

Get 360-Degree Views—Achieve the unprecedented unified view of your customer that reflects all touchpoints and interactions, regardless of customer, product, service, location, or channel. That helps you deliver new services and educate customers on how to get the most out of their relationship with your enterprise.

Leverage an Enterprise Metadata Repository—Get a unified view of your critical enterprise information sources and their data fields. This gives you single-query access to information sources across your enterprise—a key requirement as the importance of interoperability increases.

Meet Regulatory Standards—Initiatives such as Sarbanes-Oxley, Basel-II, Straight-Through Processing (STP), and the USA PATRIOT Act, Gamm-Leach-Bliley, HIPAA, and others are inherently data-driven challenges. Apparatus, platforms and methods according to the invention help you see, report, and act upon all the data—in real time.

Respond With Bi-Directional Connectivity—You need more than reporting and analysis—they need to take action. Unlike warehousing or business-intelligence disciplines, apparatus, platforms and methods according to the invention support two-way communication, enabling transactional updates that write back to every data source.

In one aspect, apparatus, platforms and methods according to the invention provide a surveillance, monitoring and real-time events platform to (i) enable the integration and communication of information between government agencies and organizations specifically tasked with ensuring the security and safety of our nation and its communities, (ii) to integrate information systems from federal, state and/or local agencies (from disparate data sources if necessary) in order to obtain a single, real-time view of the entire organization, and (iii) to extract more complete, actionable information from their existing systems, thereby dramatically improving decision making speed and accuracy.

The platform has application in a variety of areas, including, public health & bioterrorism, border and port security, public and community safety, government data integration, the travel and transportation industry, and the financial services industry, to name a few.

Public Health & BioTerrorism

Effective and timely surveillance and monitoring of health-related events is essential for early detection and management of a public health threats, whether a naturally occurring disease, such as West Nile Virus, or a biological or chemical attack. State and local public health officials must have the ability to identify the specific nature and scope of an event and launch a tightly coordinated response, all in real-time.

In one aspect of the invention, the surveillance, monitoring and real-time events platform is adapted for use, e.g., as a local, state or federal node, in a network conforming to the Public Health Information Network (PHIN) initiative of the Centers for Disease Control and Prevention (CDC) of the U.S. Department of Health and Human Services, or as an infrastructure element of that network. This provides a real-time solution that:

Delivers a dual purpose real-time syndromic surveillance system covering both bioterrorism and targeted communicable diseases Transforms data from a variety of protocols (CSV, EDI, Excel, XML) into industry standard formats HL7 and HIPPA Integrates disparate data systems (hospitals, labs, clinics, pharmacies) from any format or location quickly and without custom coding Enables synchronous and asynchronous collaboration between participating departments and personnel Provides real-time customizable reporting and GIS mapping via web-based graphical interface Initiates and manages real-time notifications to first responders and public health officials via web, email, phone, wireless PDA and mobile phone Complies with the CDC's NEDSS, HAN and PHIN architectures Systems and methods according to this aspect of the invention are designed as for multipurposes. They function as a real-time surveillance system, a bioterrorism detection and response system and a collaborative network for distance learning and communication.

As the CDC develops standards and mandated reporting protocols such as the National Electronic Disease Surveillance System (NEDSS), Health Alert Network (HAN) and Public Health Information Network (PHIN), it is up to state and local health officials to understand these new requirements and develop a system to comply. Systems and methods according to this aspect of the invention are designed to satisfy all NEDSS, HAN and PHIN requirements and more. They provide a platform technology that is highly flexible and scaleable meaning that it can adapt and stay current with new requirements and specifications with minimal effort. This feature allows health agencies to add data systems and functionality to the platform easily without impacting the current architecture.

Border & Port Security

Border and port security represent complex security challenges. These sites represent vulnerable points of entry and require monitoring of ocean vessel arrivals and departures, assessing potentially hazardous cargo, responding to immigration challenges, terrorist threats and managing the proximity risk to civilians and land-based targets such as nuclear facilities, dams, power plants, gas lines, and other biological and chemical facilities. Due to the complex and porous nature of borders and ports, many distinct organizations are required to work in close cooperation and effectively share critical information.

In one aspect of the invention, the surveillance, monitoring and real-time events plat-form is adapted for border and port security applications, providing:

Real-time information in a secure web-based user interface

Providing a consolidated view of port security status by integrating multiple agencies and organizations existing information systems to appear as one, in real-time.

Integration of meteorological or other environmental information

GIS (geo-spatial mapping) for rapid local assessment and visibility

Time-critical risk assessment based on local, state and federal data sources

Scenario-based event management for medical, emergency and public safety responders with immediate notifications to key safety personnel Public & Community Safety Local law enforcement agencies are increasingly involved in complex public safety issues. Today, airports, construction sites, concerts, and other large, high-profile community events require greater levels of security, including biometric identification and other methods of individual scanning and surveillance. The surveillance, monitoring and real-time events platform can be deployed in applications designed to identify community threats or security breaches in a wide range of settings including inter-agency solutions for superior security surveillance and response. This platform provides:

Real-time reporting with secure web-based user interface enabling a single view of a multi-agency operation Integration of critical data from existing data sources (any data in any format) to create better public safety information GIS (geo-spatial mapping) for rapid local assessment and visibility Real-time risk assessment based on local, state and federal data sources Coordinated communication and immediate notifications to key safety personnel and responders Government Solution for Data Visibility Government agencies are challenged with the daunting task of improving agency-wide and inter-agency information flow and visibility, especially in today's volatile environment. True agency-wide information access for real-time analysis is only achieved by being able to tie together all existing disparate data sources, from any location, and offer a consolidated view of critical information.

In one aspect of the invention, the surveillance, monitoring and real-time events plat-form provides a single point of access to all state security-related IT systems (Justice Dept, Law Enforcement, Dept of Health) to expedite identifying potential threats. The platform can also provide information visibility across an organizations systems. The platform:

Leverages investments in existing IT infrastructure

Provides a single, comprehensive view of critical information from all data sources Provides a solution that is operational in a fraction of the time a "traditional" data integration project would take.

Benefits from a flexible, scalable, interoperable platform capable of integrating any agency's data sources for optimal visibility and operational readiness Further aspects of the invention provide apparatus (e.g., a server/application appliance) as described above that facilitate quick and easy connections to and integration with any data source, integrate with data sources, as well as to generate alerts, reports and other information from those sources, in real-time.

The aforementioned and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which:

FIGS. 7-19 depict a visual display used in the system of FIG. 1 to call alerts and other information to the attention of the user.

DETAILED DESCRIPTION OF THE ILLUSTRATED EMBODIMENT

Figure 1:
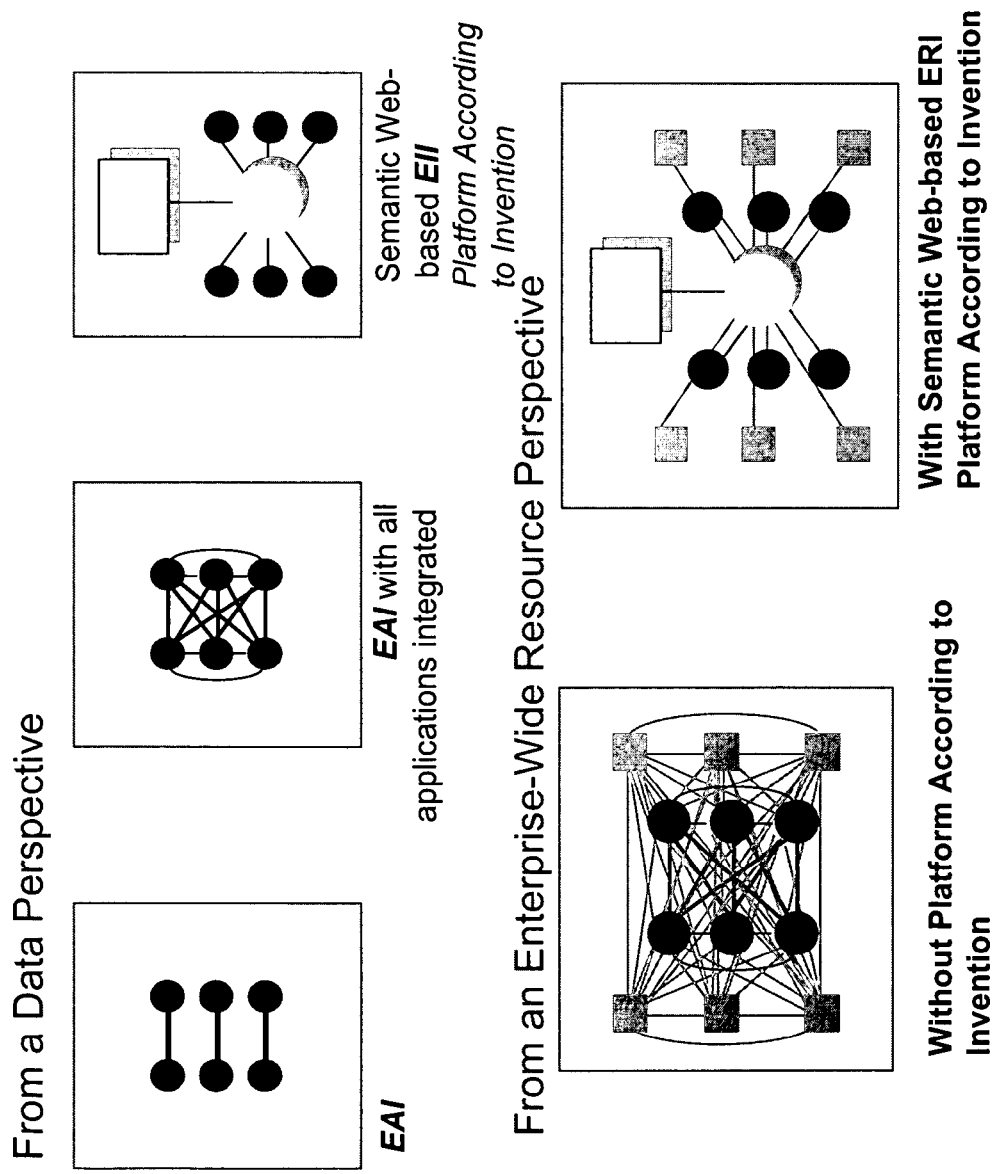
FIG. 1 depicts advantages of Eli and ERI systems according to the invention from a data perspective and an enterprise-wide resource perspective.

FIG. 1 depicts advantages of EII and ERI systems according to the invention from a data perspective and an enterprise-wide resource perspective.

Figure 2:
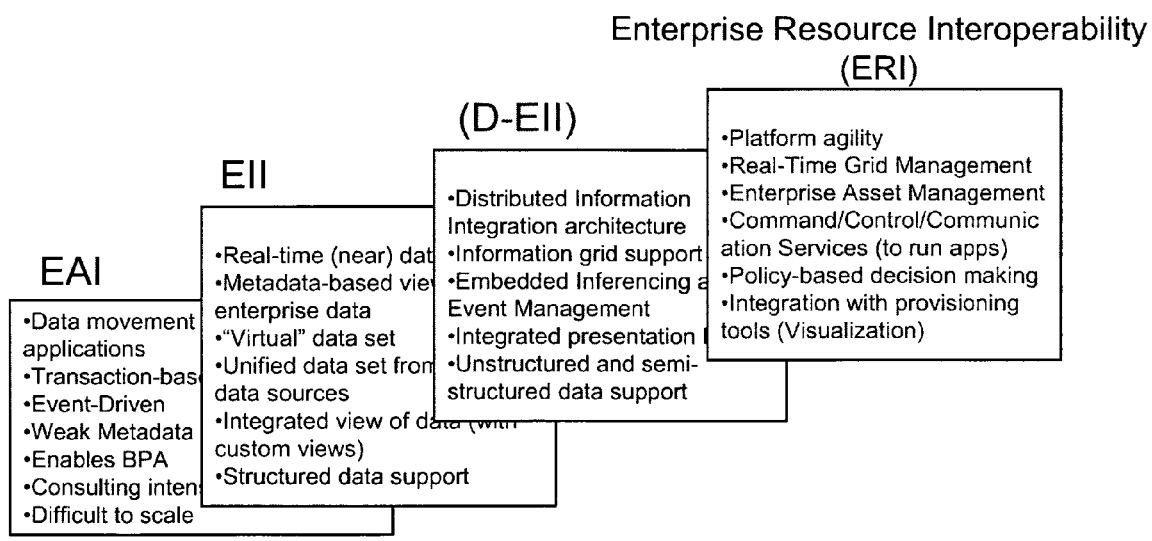
FIG. 2 depicts a relationship between enterprise application integration (EAI), EII, distributed EII (D-EII) and ERI.

FIG. 2 depicts a relationship between enterprise application integration (EAI), EII, distributed EII (D-EII) and ERI.

Figure 3:
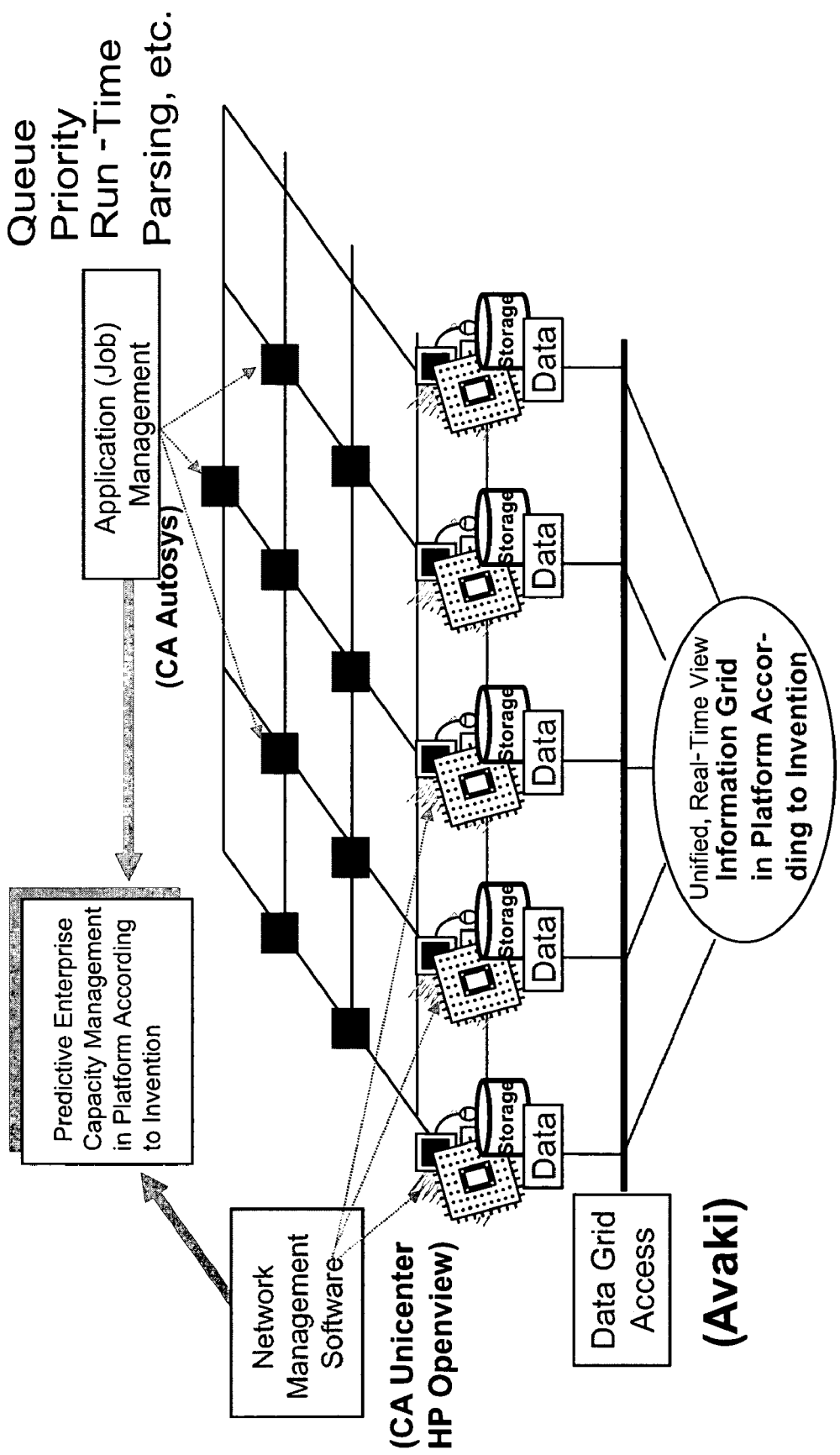
FIG. 3 depicts the components and interrelationships of a grid-based ERI platform according to the invention.

FIG. 3 depicts the components and interrelationships of a grid-based ERI platform according to the invention.

Figure 4:
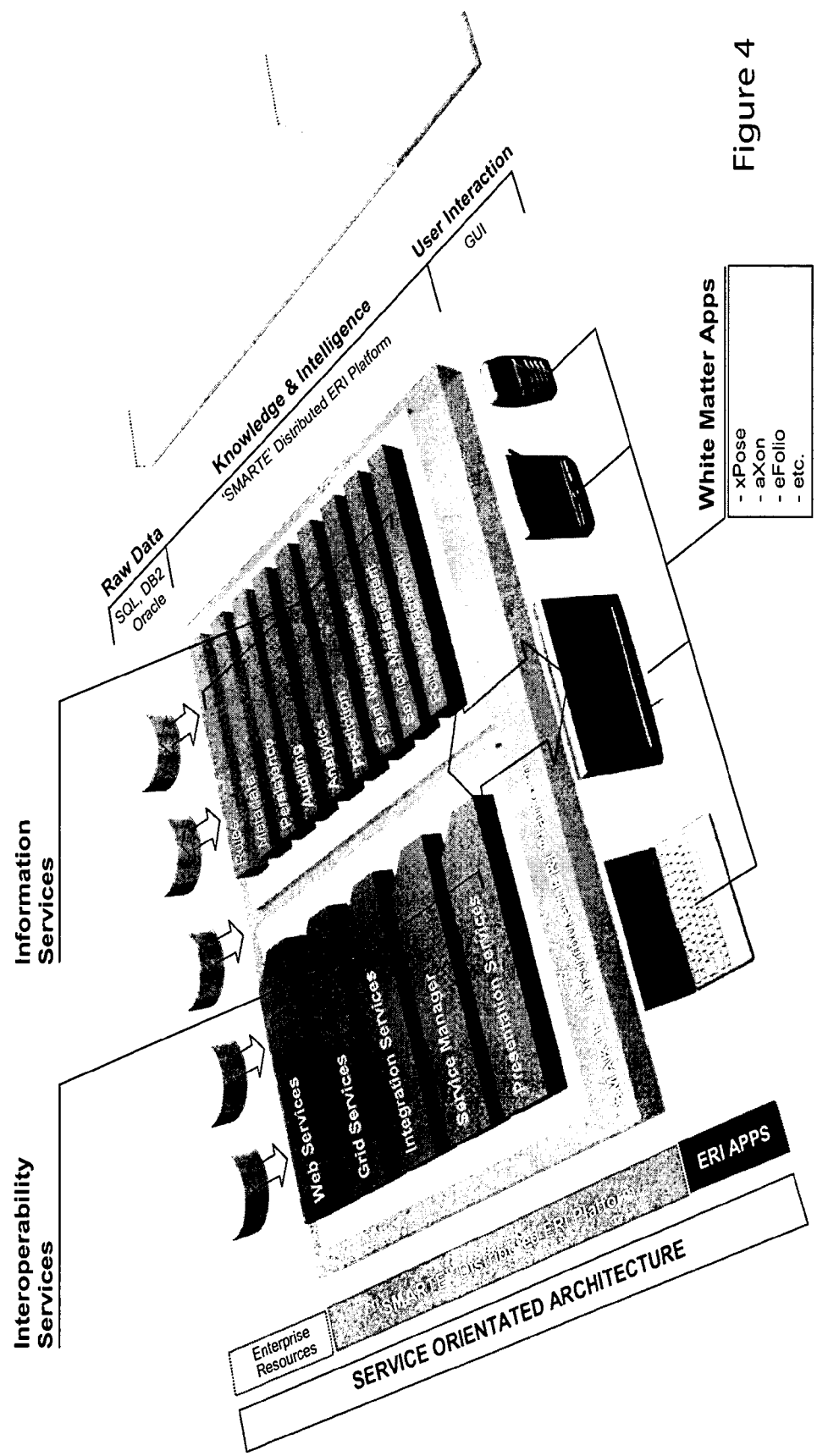
FIG. 4 depicts a relationship between raw data (e.g., as stored in SQL, DB2 and Oracle databases), knowledge and intelligence (e.g., as supported by a distributed ERI platform according to the invention) and user interaction (e.g., as supported by GUIs of "white matter" applications). The figure also depicts a relationship between information services applications, interoperability services, and the distributed ERI platform according to the invention. Still further, the figure depicts a relationship between enterprise resources, the distributed ERI plat-form according to the invention, ERI applications executing thereon, and a service oriented architecture (SOA).

FIG. 4 depicts a relationship between raw data (e.g., as stored in SQL, DB2 and Oracle databases), knowledge and intelligence (e.g., as supported by a distributed ERI platform according to the invention) and user interaction (e.g., as supported by GUIs of "white matter" applications). The figure also depicts a relationship between information services applications, interoperability services, and the distributed ERI platform according to the invention. Still further, the figure depicts a relationship between enterprise resources, the distributed ERI plat-form according to the invention, ERI applications executing thereon, and a service oriented architecture (SOA).

Figure 5:
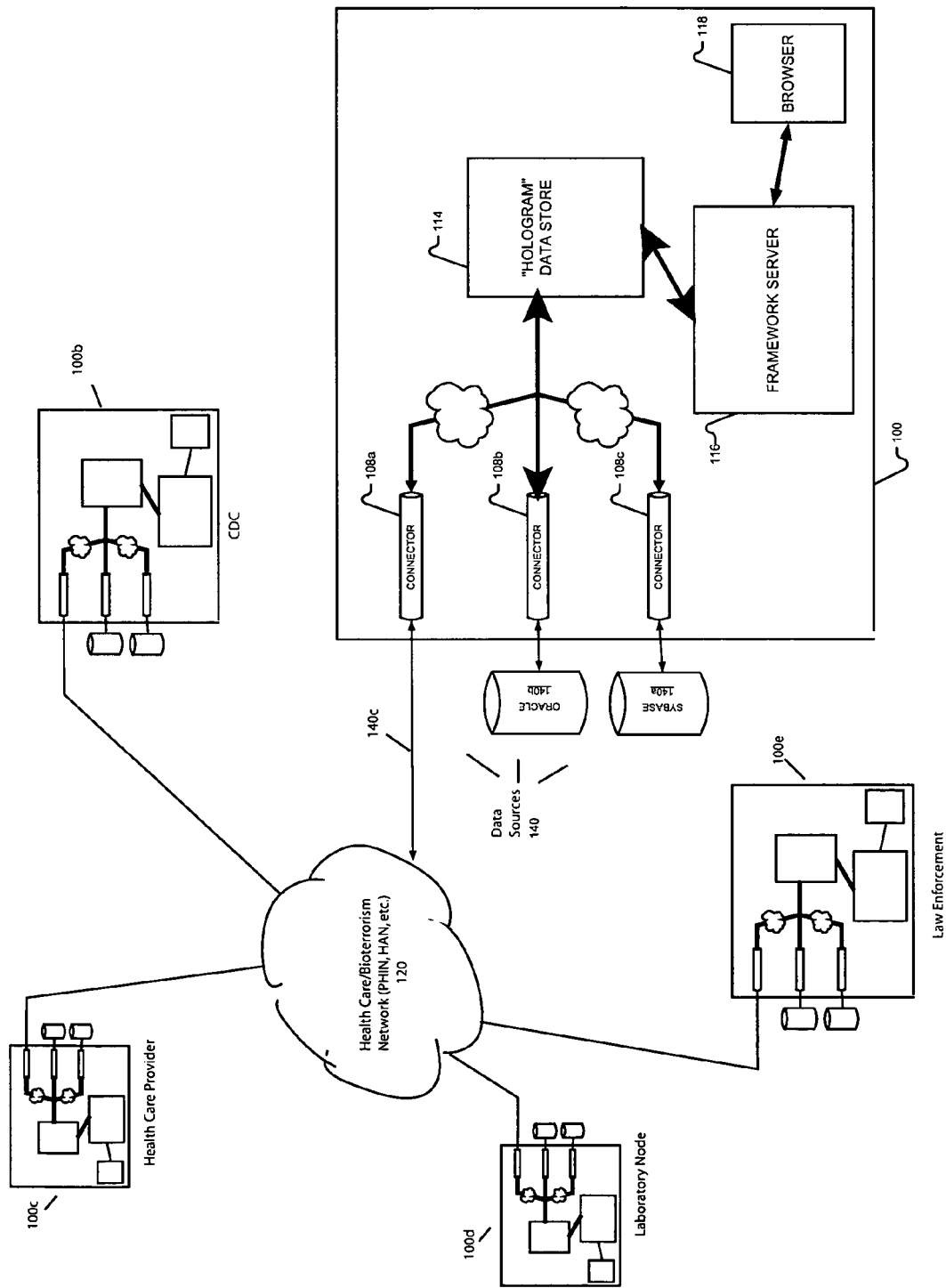
FIG. 5 depicts a surveillance, monitoring and real-time events system according to the invention suitable for the adaptation to a public health & bioterrorism application, e.g., as part of PHIN, HAN or NEDSS-compatible networks.

FIG. 5 depicts a surveillance, monitoring and real-time events system 100 of the type supported by platforms and systems according to the invention suitable for the adaptation to a public health & bioterrorism application, e.g., as part of PHIN, HAN or NEDSS networks. Illustrated system 100 represents a data processing station (or stations) resident at a node in such a network, such as, for example, a clinical care provider, a laboratory, a local or state health department, the CDC headquarters, a local or national law enforcement office, or other-wise. Though the illustrated system is used in a public health & bioterrorism application, it will be appreciated that a similar such system can be applied in border & port security, public & community safety, and government data integration applications, described above, among others.

Illustrated system 100, which can be embodied in conventional digital data processing apparatus (including attendant processor(s), display units, storage units, and communications devices) of the type conventional in the art, comprises connectors 108 that provide software interfaces to legacy and other databases, data streams, and sources of information-collectively, databases 140—in clinical care facilities or other entities (such as agency field offices or laboratories), organizations (such as a governmental agencies) or enterprises, such as the PHIN network, the HAN network or otherwise. A "hologram" data store 114 (hereinafter, "data store" or "hologram data store"), which is coupled to the databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the databases 140. These updates can include both the addition of new data and the modification of old data.

In the illustration, databases 140 include a database 140a maintained with a Sybase® database management system, a database 140b maintained with an Oracle® database management system. The "databases" 140 also include a data stream 140c providing information from other nodes 100b, 100c, 100d, 100e, of the PHIN, HAN, NEDSS or other network 120. Those other nodes can be constructed and operated in the manner of system 100 (as suggested in the illustration by their depiction using like silhouettes) or in any other manner consistent with PHIN, HAN, NEDSS or other network operations. The network 120 represents the Internet, wide area network or other medium or collection of media that permit the transfer of information (continuous, periodic or otherwise) between the nodes in a manner consistent with requirements of PHIN, HAN, NEDSS or other applicable network standards.

Of course, these are merely examples of the variety of databases or other sources of information with which methods and apparatus as described herein can be used. Common features of illustrated databases 140 are that they provide access to information of actual or potential interest to the node in which system 100 resides and that they can be accessed via application program interfaces (API) or other mechanisms dictated by the PHIN, HAN, NEDSS or other applicable network.

Connectors 108 serve as interfaces to databases, streams and other information sources 140. Each connector applies requests to, and receives information from, a respective database, using that database's API or other interface mechanism, e.g., as dictated by the PHIN, HAN or other otherwise. Thus, for example, connector 108a applies requests to database 140a using the corresponding SAP API; connector 108b applies requests to database 140b using the Oracle API; and connector 108c applies requests to and/or receives information from the stream or information source 140c use PHIN-appropriate, HAN-appropriate, NEDSS-appropriate or other stream or network-appropriate requests. Thus, by way of non-limiting example, the connector 108c can generate requests to the network 120 to obtain data from health care institutions and other nodes on the network.

The requests can be simple queries, such as SQL queries and the like (e.g., depending on the type of the underlying database and its API) or more complex sets of queries, such as those commonly used in data mining. For example, one or more of the connectors can use decision trees, statistical techniques or other query and analysis mechanisms known in the art of data mining to extract information from the databases. Specific queries and analysis methodologies can be specified by the hologram data store 114 or the framework server 116 for application by the connectors. Alternatively, the connectors themselves can construct specific queries and methodologies from more general queries received from the data store 114 or server 116. For example, request-specific items can be "plugged" into query templates thereby effecting greater speed and efficiency.

Regardless of their origin, the requests can be stored in the connectors 108 for application and/or reapplication to the respective databases 108 to provide one-time or periodic data store updates. Connectors can use expiration date information to determine which of a plurality of similar data to return to the data store, or if dates are absent, the connectors can mark returned data as being of lower confidence levels.

In a system 100 according to the invention used as part of the PHIN network, the connector 108c (and/or other functionality not shown) provides for the automated exchange of data between public health partners, as required of nodes in the PHIN network. Thus the connector 108c (and/or other functionality) comprises an ebXML compliant SOAP web service that can be reached via an HTTPS connection after appropriate authentication and comprises, or is coupled to, an HTTPS port. It also supports messaging in the industry standard requisite formats and message content specified by the PHIN standard. The connector 108c also provides for translation of messages received from the network 120 into a format compatible with the NEDSS and/or other requisite data models specified by the PHIN standards for storage in the data store 114 as detailed further below. And, the connector 108c (or other functionality) facilitates the exchange and management of specimen and lab result information, as required under the PHIN standard. Systems 100 according to the invention used as part of HAN or NEDSS-compatible networks provide similar functionality, as particularly required under those initiatives.

Data and other information (collectively, "messages") generated by the databases, streams and other information sources 140 in response to the requests are routed by connectors to the hologram data store 114. That other information can include, for example, expiry or other adjectival data for use by the data store in caching, purging, updating and selecting data. The messages can be cached by the connectors 108, though, they are preferably immediately routed to the store 114.

Information updates entered, for example, by a user who is accessing the store 114 via a server 116 and browser 118, are transmitted by server 116 to data store 114. There, any triples implicated by the change are created or changed in store 114C, as are the corresponding RDF document objects in store 114A. An indication of these changes can be forwarded to the respective databases, streams or other information sources 140 via the connectors 108, which utilize the corresponding API (or other interface mechanisms) to alert those sources 140 of updates. Likewise, changes made directly to the store 114C, e.g., using a WebDAV client or otherwise, can be forwarded by the connector 108 to the respective sources 140.

The hologram data store 114 stores data from the databases 140 (and from the frame-work server 116, as discussed below) as RDF triples. The data store 114 can be embodied on any digital data processing system or systems that are in communications coupling (e.g., as defined above) with the connectors 108 and the framework server 116. Typically, the data store 114 is embodied in a workstation or other high-end computing device with high capacity storage devices or arrays, though, this may not be required for any given implementation.

Though the hologram data store 114 may be contained on an optical storage device, this is not the sense in which the term "hologram" is used. Rather, it refers to its storage of data from multiple sources (e.g., the databases 140) in a form which permits that data to be queried and coalesced from a variety of perspectives, depending on the needs of the user and the capabilities of the framework server 116.

To this end, a preferred data store 114 stores the data from the databases 140 in subject-predicate-object form, e.g., RDF triples, though those of ordinary skill in the art will appreciate that other forms may be used as well, or instead. By way of background, RDF is a way of expressing the properties of items of data. Those items are referred to as subjects. Their properties are referred to as predicates. And, the values of those properties are referred to as objects. In RDF, an expression of a property of an item is referred to as a triple, a convenience reflecting that the expression contains three parts: subject, predicate and object.

Listed below is a portion of a data set of the type with which the invention can be practiced. The listing contains RDF triples, here, expressed in extensible markup language (XML) syntax. Those skilled in the art will, of course, appreciate that RDF triples can be expressed in other syntaxes and that the teachings hereof are equally applicable to those syntaxes. Further, the listing shows only a sampling of the triples in a data store 114, which typically would contain tens of thousands or more of such triples.

```
<rdf:RDF...xmlns="http://www.metatomix.com/postalCode/1.0#>
<rdf:Description rdf:about="postal://zip#02886">
    <town>Warwick</town>
    <state>RI</state>
    <country>USA</country>
    <zip>02886</zip>
<rdf:Description>
    <rdf:Description rdf:about="postal://zip#02901">
    <town>Providence</town>
    <state>RI</state>
    <country>USA</country>
    <zip>02901</zip>
</rdf:Description>
```

Subjects are indicated within the listing using a "rdf:about" statement. For example, the second line of the listing defines a subject as a resource named "postal://zip#02886." That subject has predicates and objects that follow the subject declaration. One predicate, <town>, is associated with a value "Warwick". Another predicate, <state>, is associated with a value "RI". The same follows for the predicates <country> and <zip>, which are associated with values "USA" and "02886," respectively. Similarly, the listing shows properties for the subject "postal://zip#02901," namely, <town> "Providence," <state> "RI," <country> "US" and <zip> "02901."

In the listing, the subjects and predicates are expressed as uniform resource indicators (URIs), e.g., of the type defined in Berniers-Lee et al, Uniform Resource Identifiers (URI): Generic Syntax (RFC 2396) (August 1998), and can be said to be expressed in a form <scheme>://<path>#<fragment>. For the subjects given in the example, <scheme> is "postal," <path> is "zip," and <fragment> is, for example, "02886" and "02901."

The predicates, too, are expressed in the form <scheme>://<path>#<fragment>, as is evident to those in ordinary skill in the art. In accord with XML syntax, the predicates in lines two, et seq., of the listing must be interpreted as suffixes to the string provided in the namespace directive "xmlns=http://www.metatomix.com/postalCode/1.0#" in line one of the listing. This results in predicates that are formally expressed as: "http://www.metatomix.com/postalCode/1.0#town," "http://www.metatomix.com/postalCode/1.0#state," "http://www.metatomix.com/postalCode/1.0#country" and "http://www.metatomix.com/postalCode/1.0#zip."

Hence, the <scheme> for the predicates is "http" and <path> is "www.metatomix.com/postalCode/1.0." The <fragment> portions are <town>, <state>, <country> and <zip>, respectively. It is important to note that the listing is in some ways simplistic in that each of its objects is a literal value. Commonly, an object may itself be another subject, with its own objects and predicates. In such cases, a resource can be both a subject and an object, e.g., an object to all "upstream" resources and a subject to all "downstream" resources and properties. Such "branching" allows for complex relationships to be modeled within the RDF triple framework.

FIGS. 1A-1B of U.S. patent application Ser. No. 10/302,764, filed Nov. 21, 2002, entitled "Methods and Apparatus for Querying a Relational Data Store Using Schema-Less Queries" (corresponding to PCT Application WO03044634, published May 30, 2003) depict an architecture for a preferred hologram data store 114 according to the invention. Those figures and the accompanying text are specifically incorporated herein by reference. As shown and discussed there, the illustrated store includes a model document store and a model document manager. It also includes a relational triples store, a relational triples store manager, and a parser interconnected as shown in the drawing.

As indicated in the aforementioned figures and discussed in the accompanying text, RDF triples maintained by the store are received—from the databases (via connectors) and/or from time-based data reduction module—in the form of document objects, e.g., of the type generated from a Document Object Model (DOM) in a JAVA, C++ or other application. These are stored in the model document store as such (i.e., document objects) particularly, using the tables and inter-table relationships shown in those figures.

The model document manager manages storage/retrieval of the document object to/from the model document store. The manager comprises the Slide content management and integration framework, publicly available through the Apache Software Foundation. It stores (and retrieves) document objects to (and from) the store in accord with the WebDAV protocol. Those skilled in the art will, of course, appreciate that other applications can be used in place of Slide and that document objects can be stored/retrieved from the store in accord with other protocols, industry-standard, proprietary or otherwise.

However, use of the WebDAV protocol allows for adding, updating and deleting RDF document objects using a variety of WebDAV client tools (e.g., Microsoft Windows Explorer, Microsoft Office, XML Spy or other such tools available from a variety of vendors), in addition to adding, updating and deleting document objects via connectors and/or time-based data reduction module. This also allows for presenting the user with a view of a traversable file system, with RDF documents that can be opened directly in XML editing tools or from Java programs supporting WebDAV protocols, or from processes on remote machines via any HTTP protocol on which WebDAV is based.

With continued reference to the aforementioned incorporated figures and accompanying text, RDF triples received by the store are also stored to a relational database that is managed and accessed by a conventional relational database management system (RDBMS), operating in accord with the teachings hereof. In that database, the triples are divided into their constituent components (subject, predicate, and object), which are indexed and stored to respective tables in the manner of a "hashed with origin" approach. Whenever an RDF document is added, updated or deleted, a parser extracts its triples and conveys them to the RDBMS with a corresponding indicator that they are to be added, updated or deleted from the relational data-base. Such a parser operates in the conventional manner known in the art for extracting triples from RDF documents.

The database store has five tables interrelated as shown in the aforementioned incorporated figures. In general, these tables rely on indexes generated by hashing the triples' respective subjects, predicates and objects using a 64-bit hashing algorithm based on cyclical redundancy codes (CRCs)—though, it will be appreciated that the indexes can be generated by other techniques as well, industry-standard, proprietary or otherwise.

The "triples" table maintains one record for each stored triple. Each record contains an aforementioned hash code for each of the subject, predicate and object that make up the respective triple, along with a resource flag ("resource_flg") indicating whether that object is of the resource or literal type. Each record also includes an aforementioned hash code ("m_hash") identifying the document object (stored in model document store) from which the triple was parsed, e.g., by the parser.

In the embodiment shown in the aforementioned incorporated figures, the values of the subjects, predicates and objects are not stored in the triples table. Rather, those values are stored in the resources table, namespaces table and literals table. Particularly, the resources table, in conjunction with the namespaces table, stores the subjects, predicates and resource-type objects; whereas, the literals table stores the literal-type objects.

The resources table maintains one record for each unique subject, predicate or resource-type object. Each record contains the value of the resource, along with its aforementioned 64-bit hash. It is the latter on which the table is indexed. To conserve space, portions of those values common to multiple resources (e.g., common <scheme>://<path> identifiers) are stored in the namespaces table. Accordingly the field, "r_value," contained in each record of the resources table reflects only the unique portion (e.g., <fragment> identifier) of each resource.

The namespaces table maintains one record for each unique common portion referred to in the prior paragraph (hereinafter, "namespace"). Each record contains the value of that namespace, along with its aforementioned 64-bit hash. As above, it is the latter on which this table is indexed.

The literals table maintains one record for each unique literal-type object. Each record contains the value of the object, along with its aforementioned 64-bit hash. Each record also includes an indicator of the type of that literal (e.g., integer, string, and so forth). Again, it is the latter on which this table is indexed.

The models table maintains one record for each RDF document object contained in the model document store. Each record contains the URI of the corresponding document object ("uri_string"), along with its aforementioned 64-bit hash ("m_hash"). It is the latter on which this table is indexed. To facilitate associating document objects identified in the models table with document objects maintained by the model document store, each record of the models table also contains the ID of the corresponding document object in the store. That ID can be assigned by the model document manager, or otherwise.

From the above, it can be appreciated that the relational triples store is a schema-less structure for storing RDF triples. As suggested by Melnik, supra, triples maintained in that store can be reconstituted via an SQL query. For example, to reconstitute the RDF triple having a subject equal to "postal://zip#02886", a predicate equal to "http://www.metatomix.com/postalCode/1.0#town", and an object equal to "Warwick", the following SQL statement is applied:

```
SELECT m.uri_string, t.resource_flg,
    concat (n1.n_value, r1.r_value) as subj,
    concat (n2.n_value, r2.r_value) as pred,
    concat (n3.n_value, r3.r_value),
    1.1_value
FROM triples t, models m, resources r1, resources r2, namespaces n1,
namespaces n2
    LEFT JOIN literals 1 on t.object=1.1_hash
    LEFT JOIN resources r3 on t.object=r3.r_hash
    LEFT JOIN namespaces n3 on r3.r_value=n3.n_value
WHERE t.subject=r1.r_hash AND r1.n_hash=n1.n_hash AND
    t.predicate=r2.r_hash AND r2.n_hash=n2.n_hash AND
    m.uri_id=t.m_hash AND t.subject=hash("postal://zip#02886") AND
    t.predicate=hash('http://www.metatomix.com/postalcode/1.0#town')
    AND
    t.object=hash('warwick')
```

Those skilled in the art will, of course, appreciate that RDF documents and, more generally, objects maintained in the store can be contained in other stores—structured relationally, hierarchically or otherwise—as well, in addition to or instead of the stores illustrated in the aformentined incorporated figures.

Referring back to FIG. 5 hereof, in a system 100 according to the invention used as part of the PHIN network, the maintenance of data in the store 114 is accomplished in a manner compatible with the applicable PHIN standards, e.g., for the use of electronic clinical data for event detection. Thus, for example, data storage is compatible with the applicable logical data model(s), can associate incoming data with appropriate existing data (e.g., a report of a disease in a person who had another condition previously reported), permits potential cases should be "linked" and traceable from detection via electronic sources of clinical data or manual entry of potential case data through confirmation via laboratory result reporting, and permits data to be accessed for reporting, statistical analysis, geographic mapping and automated outbreak detection algorithms, and so forth, all as required under the PHIN standards and further discussed below. Whether maintained in the data store 114, or otherwise, a system 100 according to the invention used as part of the PHIN network, provides directories of public health and clinical personnel accessible as required under the PHIN standards. Systems 100 according to the invention used as part of HAN or NEDSS-compatible networks provide similar functionality, as particularly required under those initiatives.

The relational triples store manager discussed above supports SQL queries such as the one exemplified above (for extracting a triple with the subject "postal://zip#02886", the predicate "http://www.metatomix.com/postalCode/1.0#town", and the object "Warwick"), in the manner described in commonly assigned U.S. patent application Ser. No. 10/302,764, filed Nov. 21, 2002, entitled METHODS AND APPARATUS FOR QUERYING A RELATIONAL DATA STORE USING SCHEMA-LESS QUERIES, the teachings of which are incorporated herein by reference (see, specifically, for example, FIG. 3 thereof and the accompanying text).

The data store can likewise include time-wise data reduction component of the type described in commonly assigned U.S. patent application Ser. No. 10/302,727, filed Nov. 21, 2002, entitled METHODS AND APPARATUS FOR STATISTICAL DATA ANALYSIS AND REDUCTION FOR AN ENTERPRISE APPLICATION, the teachings of which are incorporated herein by reference (see, specifically, for example, FIG. 3 thereof and the accompanying text), to perform a time-wise reduction on data from the database, streams or other sources.

According to one practice of the invention, data store 114 includes a graph generator that uses RDF triples to generate directed graphs in response to queries made—e.g., by a user accessing the store via the browser 118 and server 116, by a surveillance, monitoring and real-time events application executing on the server 116 or in connection with the browser 118, by another node on the network 120 and received electronically or otherwise, or made otherwise—for information reflected by triples originating from data in one or more of the databases, streams or other sources 140. Such generation of directed graphs from triples can be accomplished in any conventional manner known the art (e.g., as appropriate to RDF triples or other manner in which the information is stored) or, preferably, in the manner described in co-pending, commonly assigned U.S. patent application Ser. No. 10/138,725, filed May 3, 2002, entitled METHODS AND APPARATUS FOR VISUALIZING RELATIONSHIPS AMONG TRIPLES OF RESOURCE DESCRIPTION FRAMEWORK (RDF) DATA SETS (corresponding to PCT Application WO03094142, published Nov. 13, 2003), and Ser. No. 60/416,616, filed Oct. 7, 2002, entitled METHODS AND APPARATUS FOR IDENTIFYING RELATED NODES IN A DIRECTED GRAPH HAVING NAMED ARCS (corresponding to U.S. patent application Ser. No. 10/680,049, filed Oct. 7, 2003, and PCT Application WO2004034625, published Apr. 22, 2004), the teachings of all which are incorporated herein by reference. Directed graphs so generated can be passed back to the server 116 for presentation to the user via browser 118, they can be "walked" by the server 116 to identify specific information responsive to queries, or otherwise.

Alternatively, or in addition, to the graph generator, the data store 114 can utilize genetic, self-adapting, algorithms to traverse the RDF triples in response to such queries. To this end, the data store utilizes a genetic algorithm that performs several searches, each utilizing a different methodology but all based on the underlying query from the framework server, against the RDF triples. It compares the results of the searches quantitatively to discern which produce(s) the best results and reapplies that search with additional terms or further granularity.

In some practices of the invention, surveillance, monitoring and real-time events applications executing on the connectors 108, the server 116, the browser and/or the data store 114 utilize an expert engine-based system to identify information in the data store 114 and/or from sources 140 responsive to queries and/or otherwise for presentation via browser 118, e.g., in the form of alerts, reports, or otherwise. The information so identified can, instead or in addition, form the basis of further processing, e.g., by such surveillance, monitoring and real-time events applications, in the form of broadcasts or messages to other nodes in the network 120, or otherwise, consistent with requirements of PHIN, HAN or other applicable standards.

Thus, for example, in a system 100 adapted for use in a node on the PHIN, the expert engine-based system can be used to process data incoming from the sources 140 to determine whether it should be ignored, stored, logged for alert or classified otherwise. Data reaching a certain classification limit, moreover, can be displayed via the browser 118 and, more particularly, the dashboard discussed below, e.g., along with a map of the state, country or other relevant geographic region and/or along with other similar data.

Alternatively, in a system 100 adapted for use in a NEDSS compliant node, the expert engine-based system can be used to detect the numbers of instances occurring over time and, if the number exceeds a threshold, to generate a report, e.g., for display via a dashboard window, or generate alert messages for transfer over the network 120 to targeted personnel (e.g., as identified by action of further rules or otherwise). In such a system 100, the expert engine can also be used to subset data used for display or reporting in connection with the collaborative function, e.g., specified under the CDC's HAN guidelines.

One such expert-engine based system used in practice of the invention is disclosed in aforementioned incorporated by reference U.S. Patent Application Ser. No. 60/416,616, filed Oct. 7, 2002, entitled METHODS AND APPARATUS FOR IDENTIFYING RELATED NODES IN A DIRECTED GRAPH HAVING NAMED ARCS (corresponding to U.S. patent application Ser. No. 10/680,049, filed Oct. 7, 2003, and PCT Application WO2004034625, published Apr. 22, 2004). Those skilled in the art will, of course, appreciate that different expert engine-based systems (or rules for operation therof) may be applicable depending on the nature and focus of the information sought by any given surveillance, monitoring and real-time events application and that construction of such rules is within the ken of those skilled in the art based on the teachings hereof.

Figure 20:
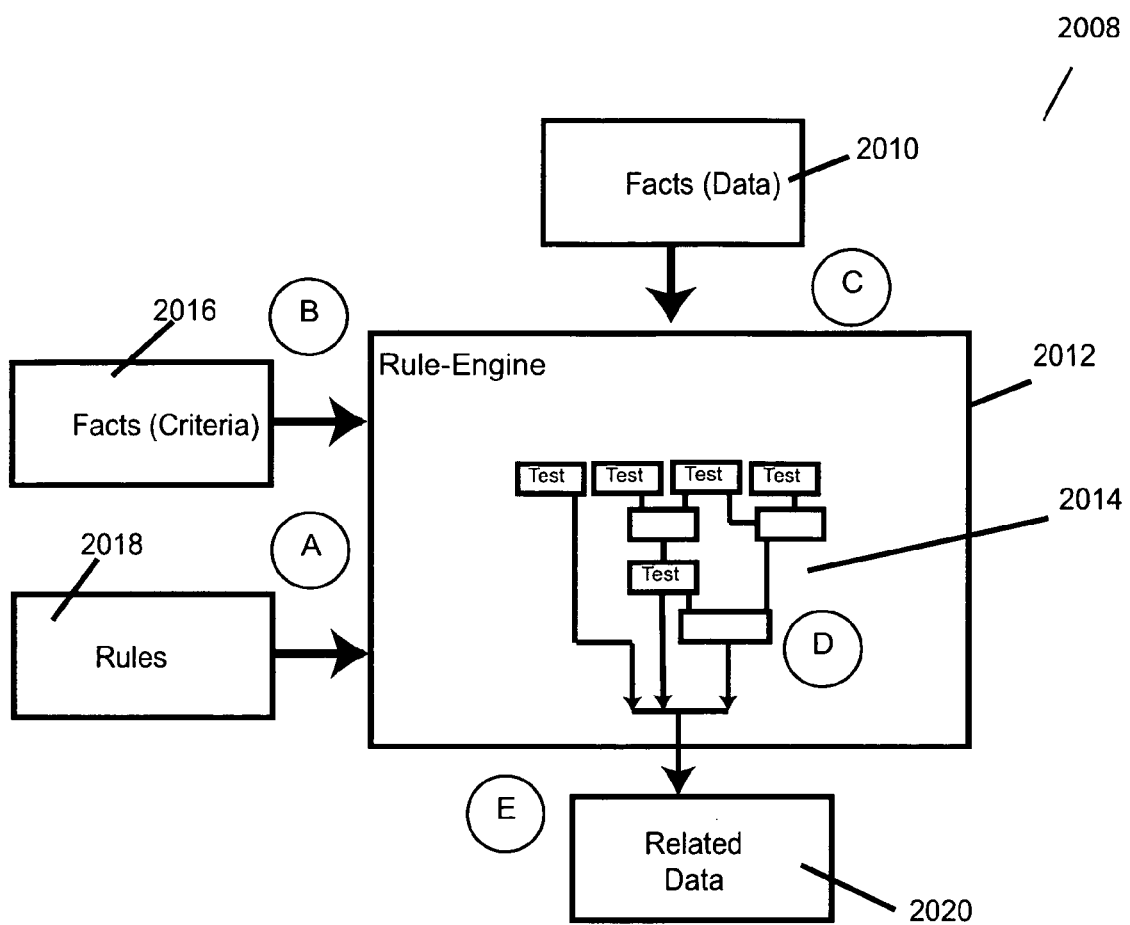
FIG. 20 depicts an expert engine according to one practice of the invention.

Referring to FIG. 20, the system 2008 includes a module 2012 that executes a set of rules 2018 with respect to a set of facts 2016 representing criteria in order to (i) generate a subset 2020 of a set of facts 2010 representing an input data set, (ii) trigger a further rule, and/or (iii) generate an alert, broadcast, message, or otherwise. For simplicity, in the discussion that follows the set of facts 2016 representing criteria are referred to as "criteria" or "criteria 16," while the set of facts 2010 representing data are referred to as "data" or "data 2010."

Illustrated module 2012 is an executable program (compiled, interpreted or otherwise) embodying the rules 2018 and operating in the manner described herein for identifying subsets of directed graphs. In the illustrated embodiment, module 2012 is implemented in Jess (Java Expert System Shell), a rule-based expert system shell, commercially available from Sandia National Laboratories. However it can be implemented using any other "expert system" engine, if-then-else network, or other software, firmware and/or hardware environment (whether or not expert system-based) suitable for adaptation in accord with the teachings hereof.

The module 2012 embodies the rules 2018 in a network representation 2014, e.g., an if-then-else network, or the like, native to the Jess environment. The network nodes are preferably executed so as to effect substantially parallel operation of the rules 2018, though they can be executed so as to effect serial and/or iterative operation as well or in addition. In other embodiments, the rules are represented in accord with the specifics of the corresponding engine, if-then-else network, or other software, firmware and/or hardware environment on which the embodiment is implemented. These likewise preferably effect parallel execution of the rules 18, though they may effect serial or iterative execution instead or in addition.

The data set 2010 can comprise any directed graph, e.g., a collection of nodes representing data and directed arcs connecting nodes to one another, though in the illustrated embodiment it comprises RDF triples contained in the data store and/or generated from information received from the other sources via connectors. Alternatively, or in addition, the data set can comprise data structures representing a meta directed graph of the type disclosed in co-pending, commonly assigned U.S. patent application Ser. No. 10/138,725, filed May 3, 2002, entitled METHODS AND APPARATUS FOR VISUALIZING RELATIONSHIPS AMONG TRIPLES OF RESOURCE DESCRIPTION FRAMEWORK (RDF) DATA SETS, e.g., at FIG. 4A-6B and accompanying text, all of which incorporated herein by reference.

Criteria 2016 contains expressions including, for example, literals, wildcards, Boolean operators and so forth, against which nodes in the data set are tested. In embodiments that operate on RDF data sets, the criteria can specify subject, predicate and/or object values or other attributes. In embodiments that operate on directed graphs of other types other appropriate values and attributes may be specified. The criteria can be input by a user, e.g., via a browser, e.g., on an ad hoc basis. Alternatively or in addition, they can be generated by surveillance, monitoring and real-time events applications executing on the connectors, the server, the browser and/or the data store.

Rules 2018 define the tests for identifying data in the data set 2020 that match the criteria or, where applicable, are related thereto. These are expressed in terms of the types and values of the data items as well as their interrelationships or connectedness. By way of example, a set of rules applicable to a data set comprised of RDF triples for identifying triples that match or are related to the criteria are disclosed in aforementioned incorporated by reference U.S. Patent Application Ser. No. 60/416,616, filed Oct. 7, 2002, entitled METHODS AND APPARATUS FOR IDENTIFYING RELATED NODES IN A DIRECTED GRAPH HAVING NAMED ARCS. Those skilled in the art will, of course, appreciate that different rules may be applicable depending on the nature and focus of the information sought by any given surveillance, monitoring and real-time events application and that construction of such rules is within the ken of those skilled in the art based on the teachings hereof.

Referring to back to FIG. 20, the data 2020 output or otherwise generated by module 2012 represents those triples matching (or, where applicable, related) to the criteria as determined by exercise of the rules. The data 2020 can be output as triples or some alternate form, e.g., pointers or other references to identified data within the data set 2010, depending on the needs of the surveillance, monitoring and real-time events application that invoked the system 2008. As noted above, instead of or in addition to outputting data 2020, the module 2012 triggers execution of further rules, generate alerts, broadcasts, messages, or otherwise, consistent with requirements of PHIN, HAN or other applicable standards.

In the illustrated embodiment triples identified by the expert engine-based system can be output as such or in alternate form, e.g., pointers or other references to identified data within the data set 10, depending on the needs of the surveillance, monitoring and real-time events application that invoked the system 8. Instead of or in addition, the identified triples can trigger execution of further rules (e.g., in the expert engine system), generate alerts, broadcasts, messages, or otherwise, consistent with requirements of PHIN, HAN or other applicable standards.

The framework server 116 presents information from the data store 114 and/or sources 140 via browser 118. This can be based on requests entered directly by the user directly, e.g., in response to selections/responses to questions, dialog boxes or other user-input controls generated by a surveillance, monitoring and real-time events application executing on the server 116 or in connection with the browser 118. It can also be based, for example, on information obtained from the database 114 and/or sources 140 by the expert engine-based system 8 described above.

A further understanding of the operation of the framework server 116 may be attained by reference to the appendix filed with U.S. patent application Ser. No. 09/917,264, filed Jul. 27, 2001, and entitled METHODS AND APPARATUS FOR ENTERPRISE APPLICATION INTEGRATION (corresponding to WO02093319, published Nov. 21, 2002), which appendix is incorporated herein by reference.

As illustrated on FIGS. 7-19, system 100 may provide a surveillance, monitoring and real-time events application that includes a "dashboard" with display windows or panels that provide comprehensive real-time displays of information gathered from the data store 114 or other sources 140, as well as "alerts" resulting from anomalous situations detected by the surveillance, monitoring and real-time events application. The dashboard and alerts can be generated by an application executing on the server 116 and/or the browser 118 or otherwise.

Surveillance, monitoring and real-time events dashboards can display information and alerts that are specific to predefined categories, such as boarder and port security, health and bioterrorism, or public and community safety. These can be configured by users to display information from ad hoc combinations of data sources and user-defined alerts. For the purpose of describing the structure and operation of the surveillance, monitoring and real-time events dashboards, reference will be made to two representative examples (boarder/port security and health/bioterrorism), although these descriptions apply to other predefined and user-defined categories of information.

Figure 7:
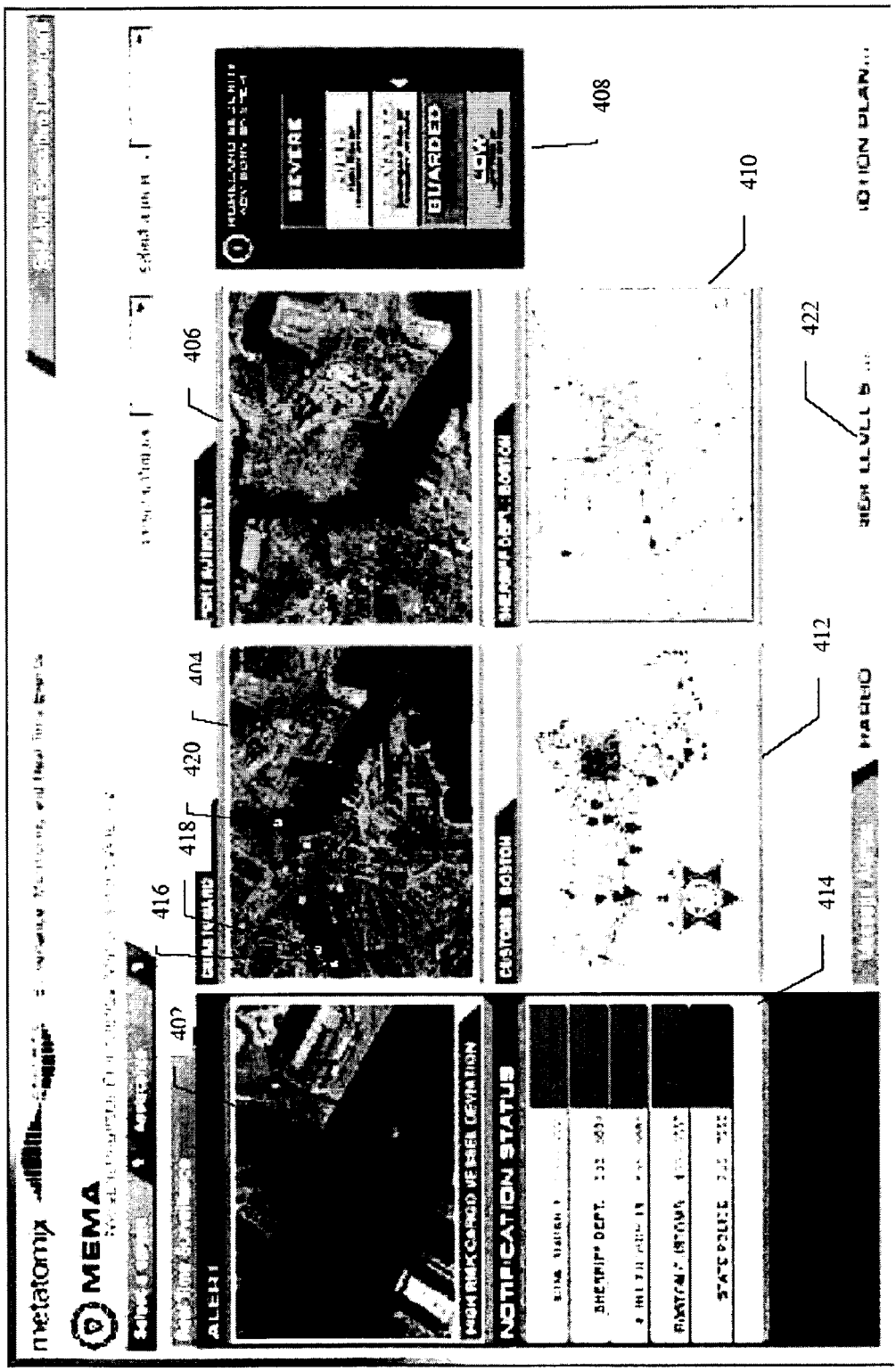

FIG. 7 illustrates a border/port security dashboard 400. The dashboard displays several panels 402, 404, 406, 408, 410, 412 and 414. Panel 402 can be used to display information relating to an alert, if one has been issued by the surveillance, monitoring and real-time events application or by an external system. Panel 402 is described in more detail below. Each panel 404-414 displays information from a particular data source or an aggregation of data from several data sources. For example, panel 404 can contain real-time radar data from the US Coast Guard superimposed on a satellite image of Boston's inner harbor. The panel 404 display can be augmented with other Coast Guard data. For example, global positioning system (GPS) data from US Coast Guard vessels and vehicles (collectively "units") can be used to identify and then look up information related to these units. The unit identities can be superimposed on the image displayed in panel 404, as shown at 416, 418 and 420. Double-clicking on one of these units can cause the surveillance, monitoring and real-time events application to display information about the unit. This information can include, for example, contact information (e.g. frequency, call sign, name of person in charge, etc.), capabilities (e.g. maximum speed, crew size, weaponry, fire-fighting equipment, etc.) and status (e.g. docked, patrolling, busy intercepting a vessel, etc.).

Panel 406 can contain real-time data from a port authority superimposed on a map of the inner harbor. Note that port authority data can include information related to the inner harbor that is different than information provided by the US Coast Guard. For example, the port authority data can include information on vessels traveling or docked within the inner harbor. Furthermore, the port authority data can relate to more than just the inner harbor. For example, the port authority data can include information related to an airport and a rail yard.

Other panels 410 and 412 can display information from other data sources, such as US Customs and local or state police. Panel 408 displays a current Homeland Security Advisory System threat level. Panel 414 displays contact information for agencies, such as the US Coast Guard, US Customs, port authority and state police, that might be invoked in case of an alert.

Figure 8:
Figure 9:
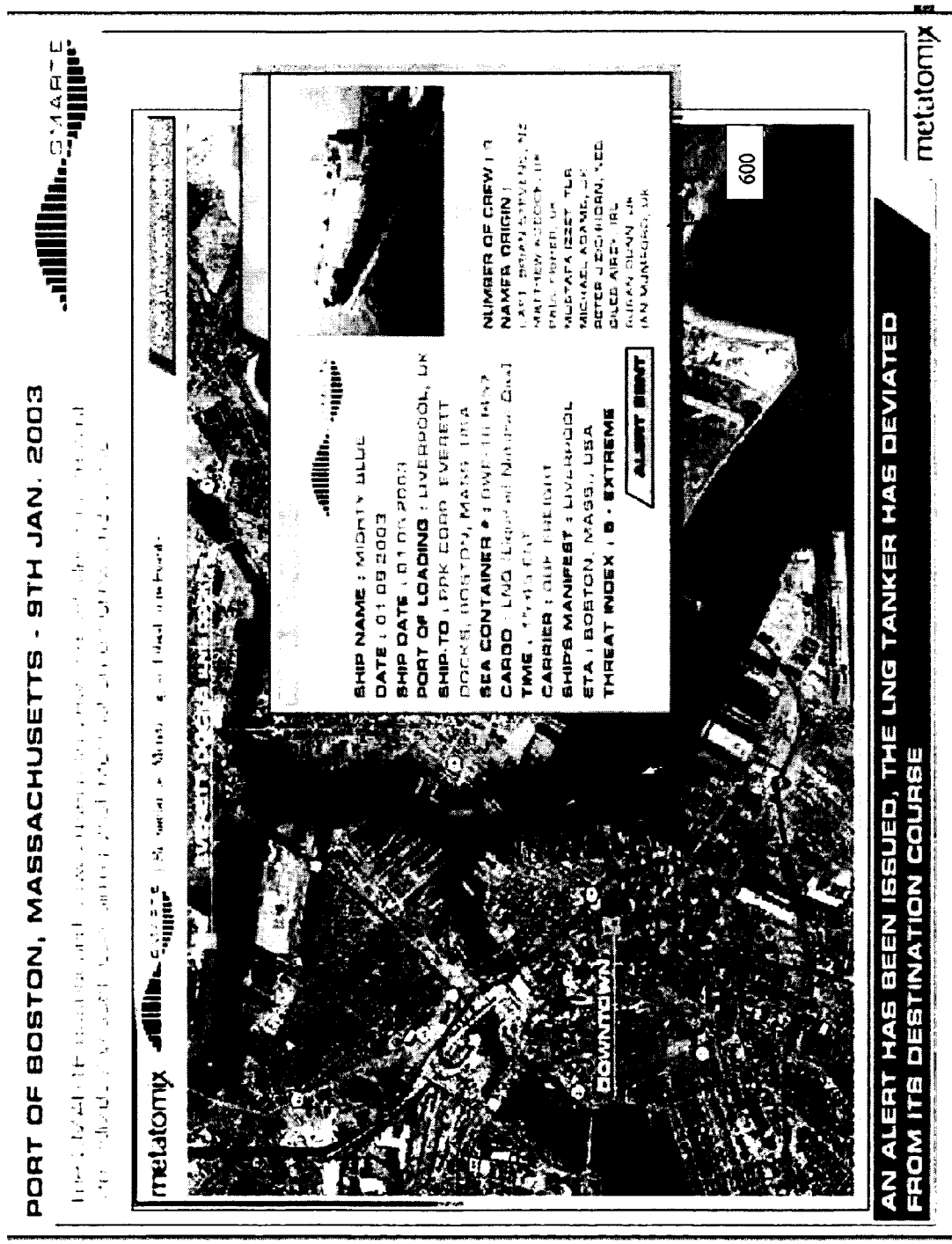

A user can double-click on any panel to display a separate window containing the panel. By this mechanism, the user can enlarge any panel. In addition, through appropriate mouse or keyboard commands, the user can zoom in on a portion of the image displayed by a panel. For example, the user can select a point on the panel display to re-center the display to the selected point and zoom in on that point. Alternatively, the user can select a rectangular portion of the panel display using a "rubber band" cursor and instruct the system to fill the entire panel with the selected portion. FIG. 8 illustrates an example of such a window 500 displaying the port authority panel 406 of FIG. 7. A user can, for example, double-click on a vessel 502 to display information about the vessel. FIG. 9 illustrates an example of a pop-up window 600 that displays information about the selected vessel.

Although panels 402-414 contain graphical displays, other panels (not shown) can contain textual or numeric data. For example, panels containing shipping schedules, airline schedules, port volume statistics, recent headlines, weather forecasts, etc. can be available for display. Of course, other graphical panels, such as current meteorological data for various portions of the world, can also be available. The surveillance, monitoring and real-time events application can make available more panels than can be displayed at one time on the dashboard 400 (FIG. 7). The dashboard 400 can display a default set of panels, such as panels 404-414. Optionally, the user can select which panels to display in the dashboard 400, as well as arrange the panels within the dashboard and control the size of each panel. If it is deemed desirable to display more panels than can be displayed at one time, some or all of the desired panels can be displayed on a round-robin basis.

In addition to allowing users to select items on panels to obtain further information about these items, the surveillance, monitoring and real-time events application can include rules and/or heuristics to automatically detect anomalies and alert users to these anomalies (hereinafter referred to as "alerts"). As a result of one of these alerts, the surveillance, monitoring and real-time events application preferably can select one or more panels containing particularly relevant information and display or enlarge those panels. The selected panels need not be ones that the user could select. For example, the surveillance, monitoring and real-time events application can create a new panel that includes a combination of data from several sources, the sources being selected by rule(s) that caused the alert to be issued.

Figure 10:
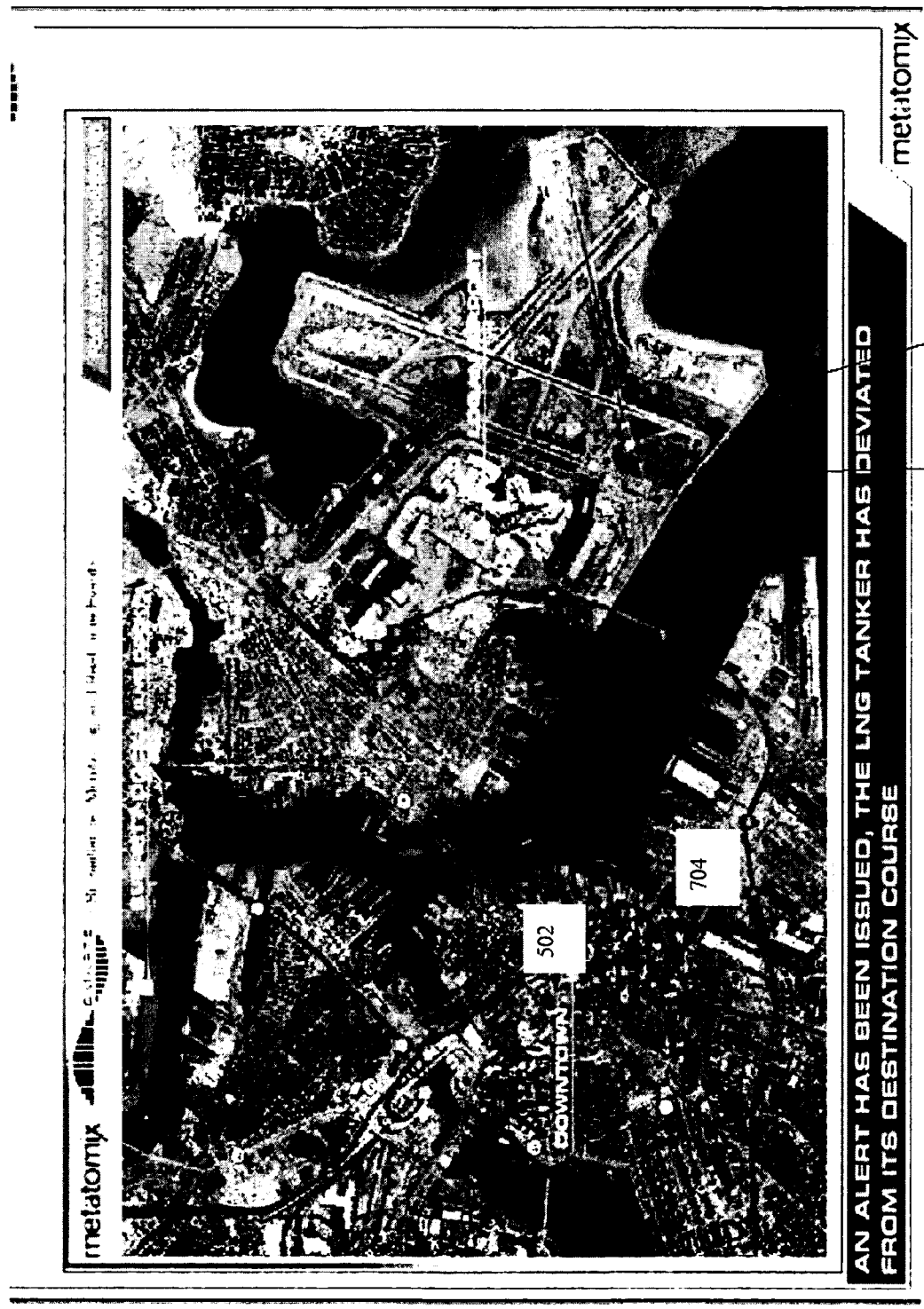

The following example illustrates how an alert can be issued. As shown in FIG. 10, the inner harbor can be partitioned into shipping lanes 700 and 702. The surveillance, monitoring and real-time events application can include rules describing permitted, required and/or prohibited behavior of vessels in these shipping lanes 700 and 702. Some rules can apply to all vessels. Other rules can apply to only certain vessels, for example according to the vessels' types, cargos, speeds, country of registry, as well as according to data unrelated to the vessels, such as time of day, day of week, season, Homeland Security Advisory System threat level, amount of other harbor traffic or amount or schedule of non-harbor traffic, such as aircraft at an adjacent airport. Other rules can apply to docked vessels, vessels under tow, etc. Similarly, rules can apply to aircraft, vehicles, or any measurable quantity, such as air quality in a subway station, seismic data, voltage in a portion of a power grid or vibration in a building, bridge or other structure. Rules can also apply to data entered by humans, such as the number of reported cases of food poisoning or quantities of antibiotics prescribed, ordered or on hand during a selected period of time.

Under normal circumstances, i.e. when no alerts are pending, the dashboard 400 (FIG. 7) displays a default set of panels or a set of panels selected by the user, as previously described. If, for example, the previously mentioned tanker vessel 502 (FIG. 10) carrying a hazardous cargo, such as liquefied natural gas (LNG), deviates 704 from a prescribed course, the surveillance, monitoring and real-time events application can issue an alert. Note that rules for vessels carrying hazardous cargos can be different than for vessels carrying non-hazardous cargos. In addition, other vessels can trigger the alert. For example, if the LNG tanker 502 is traveling within its prescribed course, but a high-speed vessel (not shown) or an aircraft is on a collision course with the LNG tanker, the surveillance, monitoring and real-time events application can issue an alert.

As a result of the alert, the surveillance, monitoring and real-time events application displays the alert panel 402 (FIG. 7) and an alert message 422. In this case, the alert panel 402 displays a zoomed-in portion of the port authority panel 406. In addition, the surveillance, monitoring and real-time events application can automatically notify a predetermined list of people or agencies. The particular people or agencies can depend on factors, such as the time of day or the day of the week of the alert. Optionally, the surveillance, monitoring and real-time events application can notify other users at other nodes, such as nodes 100b, 100c, 100d and/or 100e (FIG. 5). Information displayed on dashboards (not shown) at these other nodes 100b-e need not be the same as information displayed on the dashboard 400. In particular, the information displayed on these other nodes 100b-e can be more or less detailed than the information displayed on the dashboard 400. For example, summary information, such as an icon displayed on a map of the United States, can be displayed at command/control node to indicate an alert in Boston, without necessarily displaying all details related to the alert. A user at the command/control node can double-click on the icon to obtain more detailed information.

Figure 11:
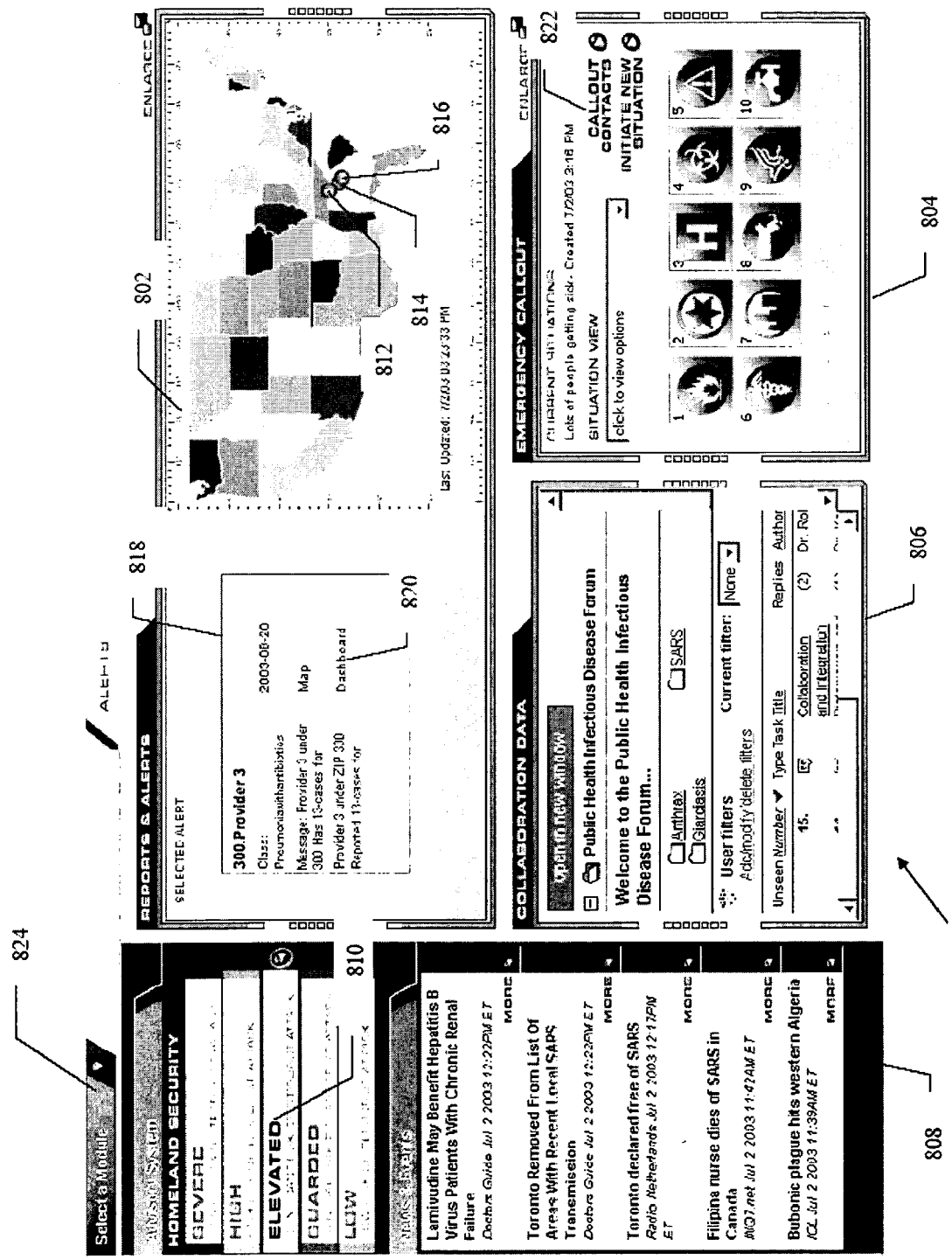

FIGS. 11-19 illustrate an exemplary dashboard that can be used in a health and bioterrorism context. FIG. 11 illustrates a dashboard 800 that contains several panels 802, 804, 806, 808 and 810. Panel 802 contains a map of the U.S. with icons 812, 814, 816 indicating locations of three alerts. Panel 804 contains emergency contact information that is relevant to the alerts. Panel 806 contains hyperlinks to discussion forums, in which agency representatives and other authorized groups and people can post messages and replies, as is well known in the art. Panel 808 contains hyperlinks to information that is relevant to the alerts. Panel 810 displays the current Homeland Security Advisory System threat level. These panels will be described in more detail below.

Figure 12:
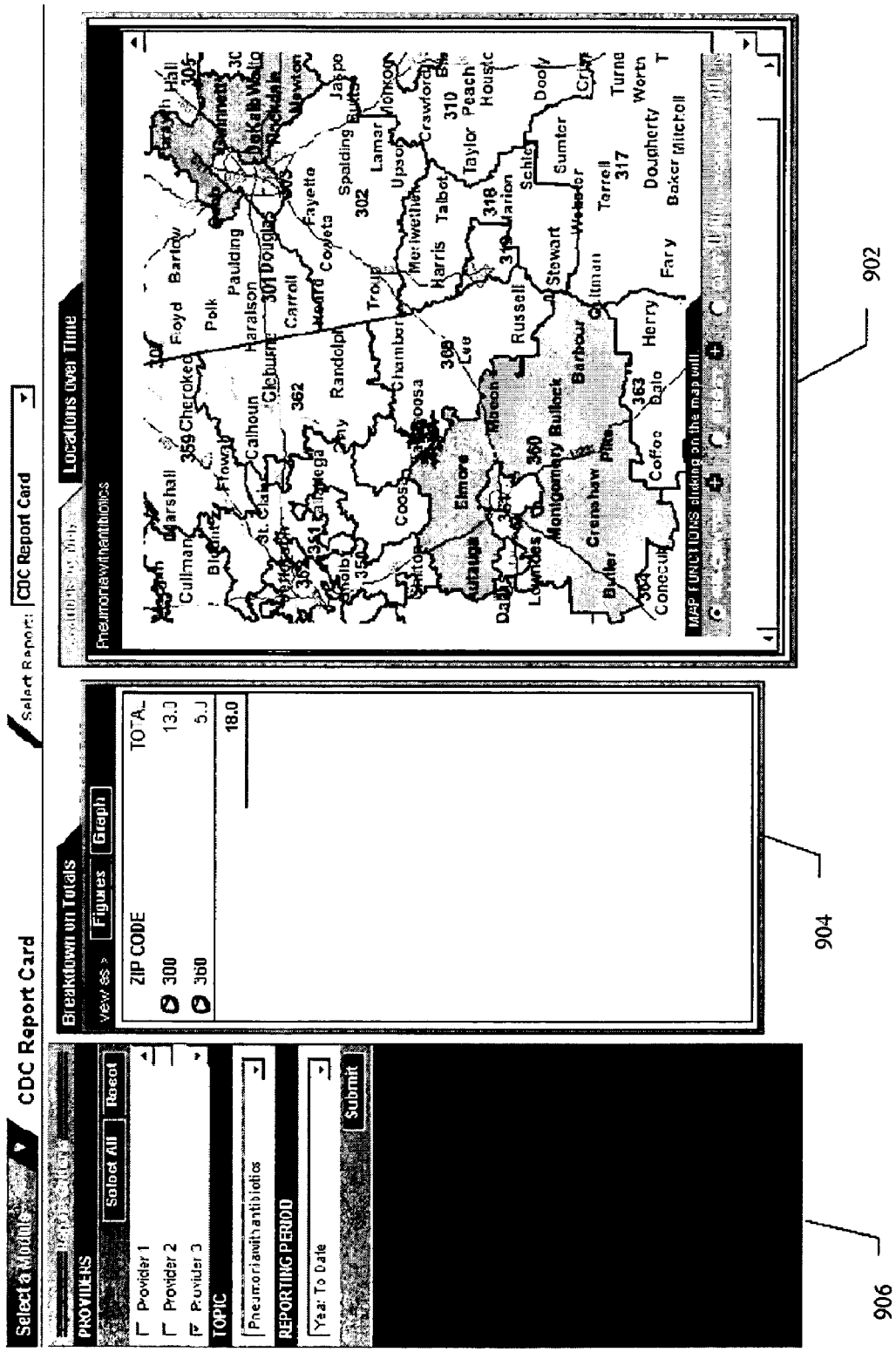

In this example, the icons 812, 814 and 816 represent medical care providers that have experienced noteworthy events or levels of activity. As previously described, an alert can be issued if, for example, the number of cases of disease, such as influenza, exceeds a predetermined threshold. In this example, Provider 3 has encountered patients with pneumonia that does not respond to antibiotics. The other alerts could relate to other anomalous events or levels of activity. Clicking the icon 816 causes the system to display information 818 related to the selected alert. Clicking on a link 820 causes the system to display more detailed information about the alert. For example, FIG. 12 illustrates two panels 902 and 904, as well as a user selection area 906, that can be displayed. Panel 902 contains a more detailed map of the area in which the event occurred. Panel 904 list the number of cases by zip code of the patients. User selection area 906 enables the user to select one or more of the alerts, thereby selecting or aggregating data from the selected provider(s) for display in panels 902 and 904.

Figure 13:
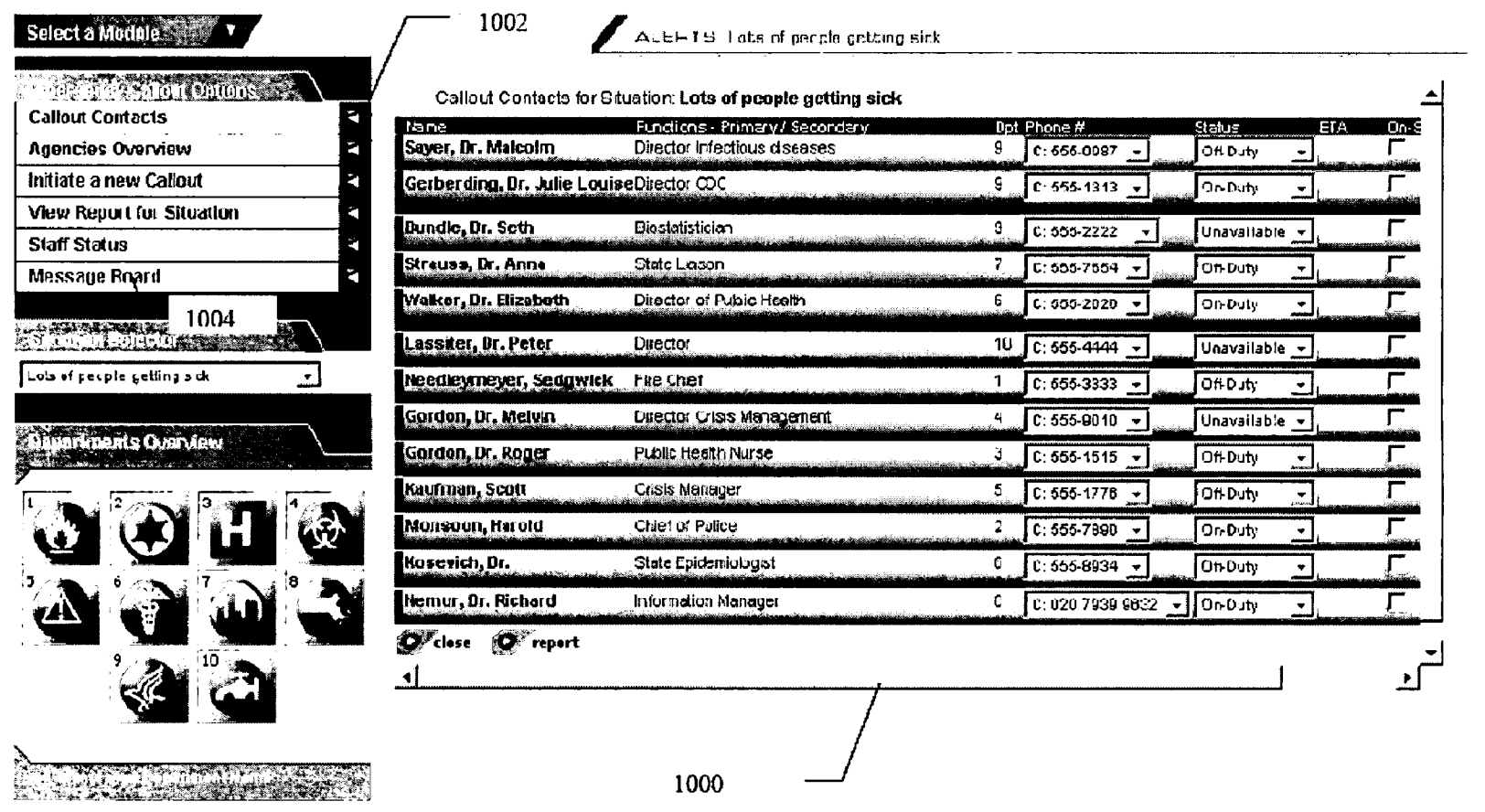
Figure 14:
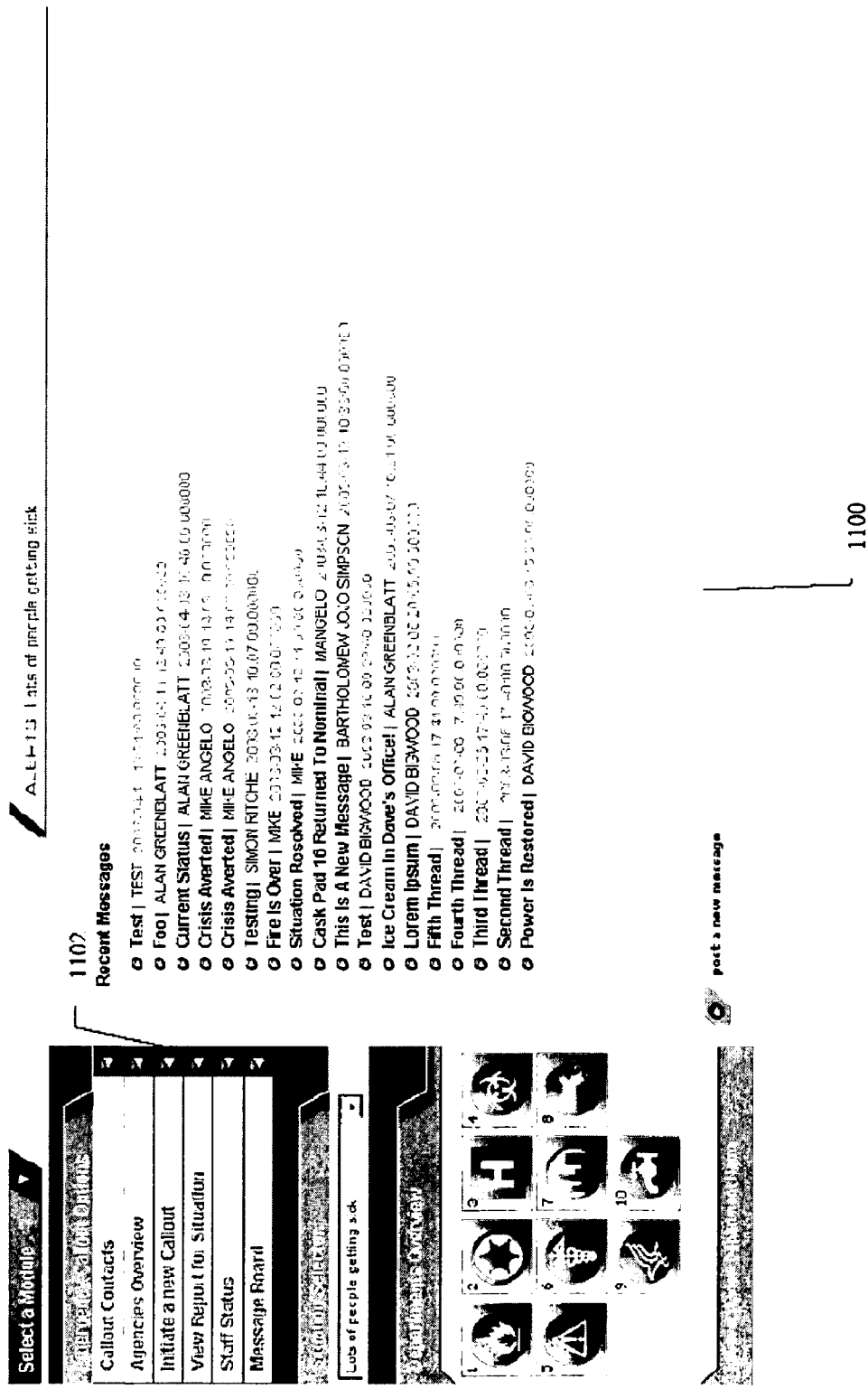
Figure 15:
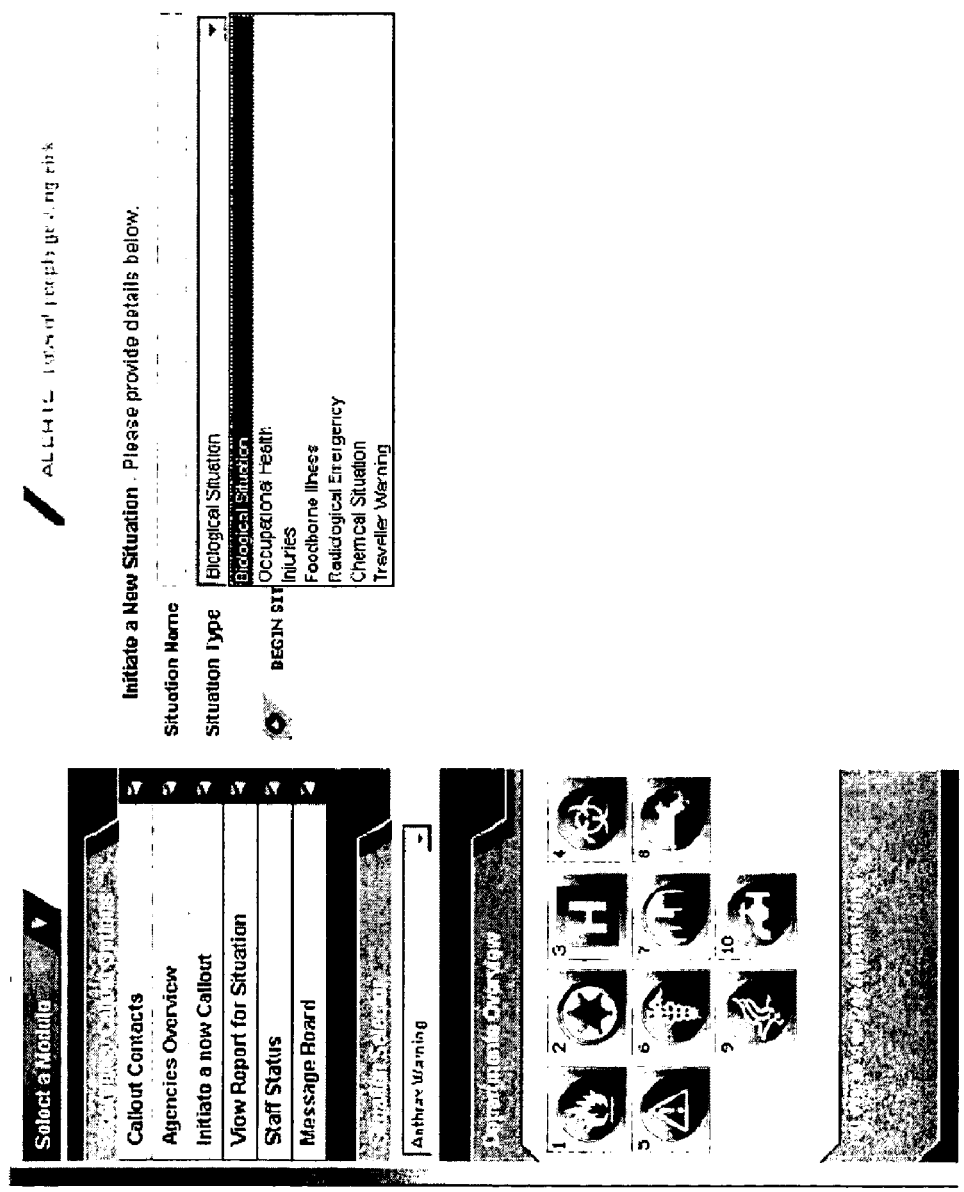

Returning for a moment to FIG. 11, panel 804 contains icons for government agencies and other individuals or organizations (collectively "responders") that might be called upon to respond to manage a biological, nuclear, foodborne or other situations identified by the expert engine-based system 8 (e.g., as where the number of instances matching a specified critereon exceeds a threshold). Clicking link 822 displays a window containing emergency contact information for these responders, as shown in FIG. 13 at 1000. Panel 1002 contains several emergency callout options, by which the user can manage the alerts. For example, clicking "Message Board" link 1004 displays a window containing messages posted in relation to this alert, as shown in FIG. 14 at 1100. This message board enables users and responders to communicate with each other in relation to the alert. An "Initiate a new Callout" link 1102 enables the user to initiate a new situation, as shown in FIG. 15.

Figure 16:
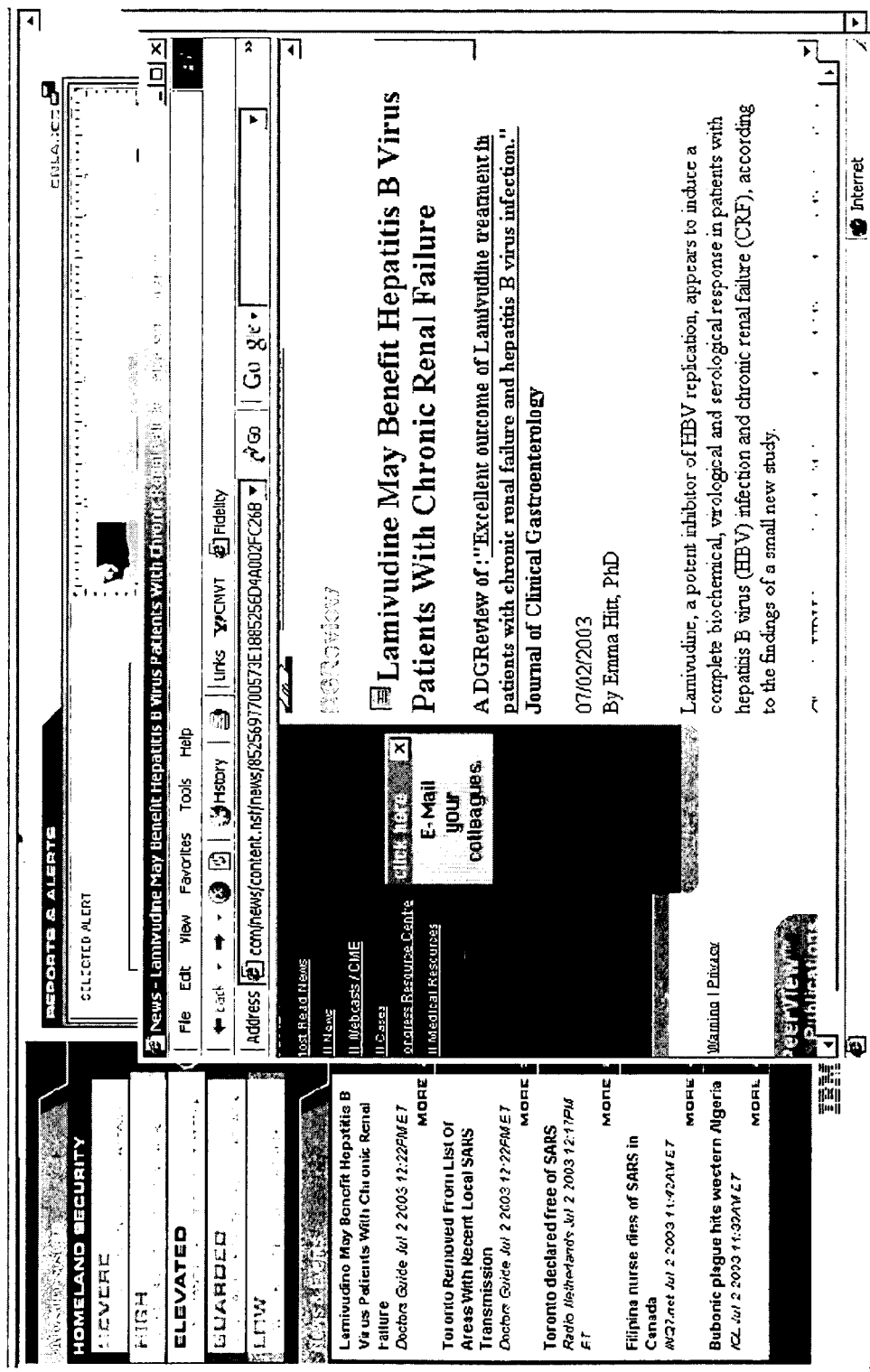

In response to an alert, the surveillance, monitoring and real-time events application automatically performs searches of the Internet and responder intranets for information relevant to the alert. As previously mentioned, panel 808 (FIG. 11) contains hyperlinks to information that is relevant to the alerts, including results from these searches and predefined information sources that have been identified as relevant. The surveillance, monitoring and real-time events application can, for example, have a database of information sources catalogued according to alert type. As shown in FIG. 16, clicking on one of the hyperlinks in the panel 808 opens a new window 1300 displaying contents identified by the hyperlink.

Returning again to the dashboard 800 shown in FIG. 11, the user can select a module via a pull-down list 824. For example, the user can select "Reports", in which case the system displays a window similar to that shown in FIG. 17. After selecting one or more providers 1402 and 1404, the system displays a report in a report panel 1406.

Figure 18:
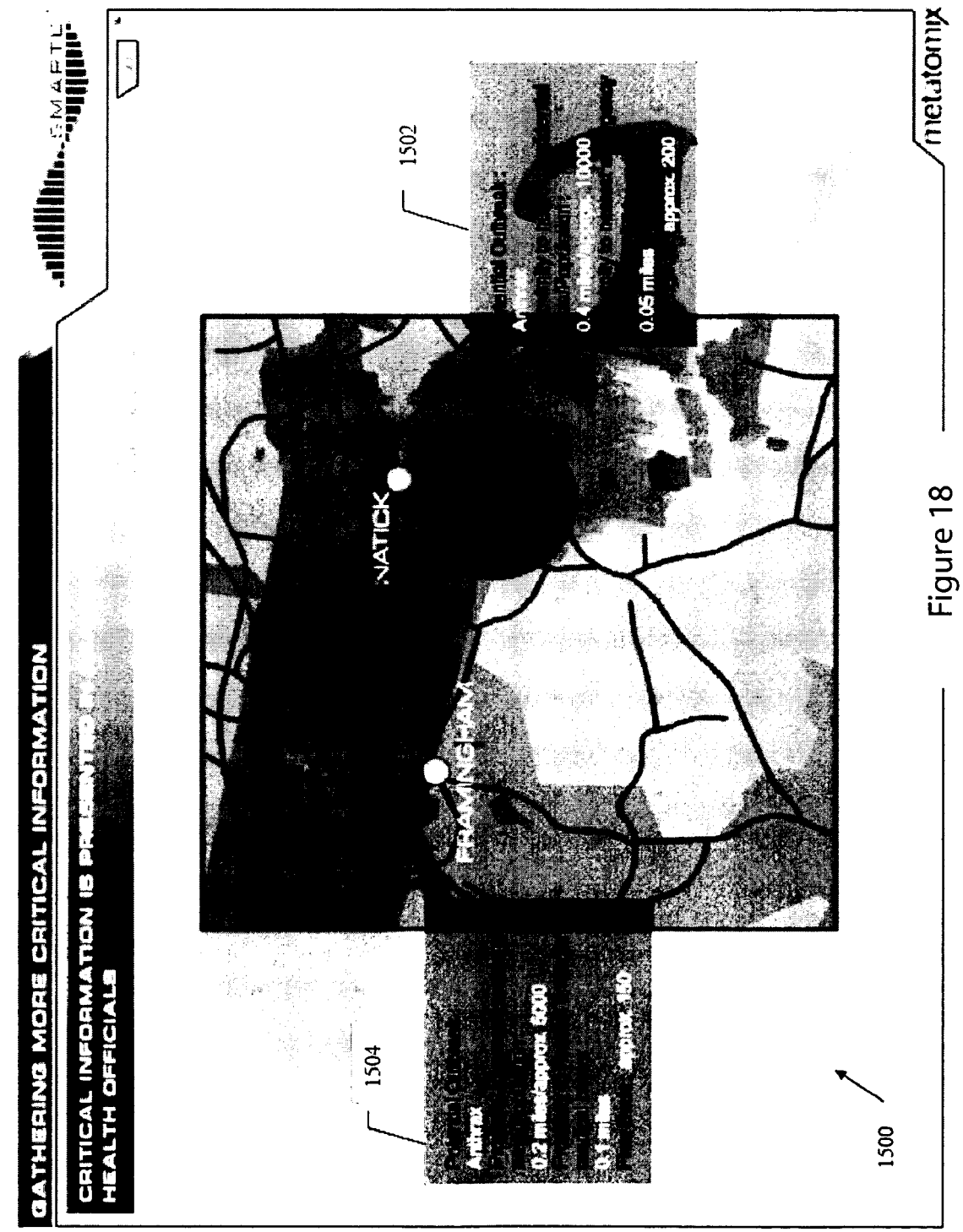
Figure 19:
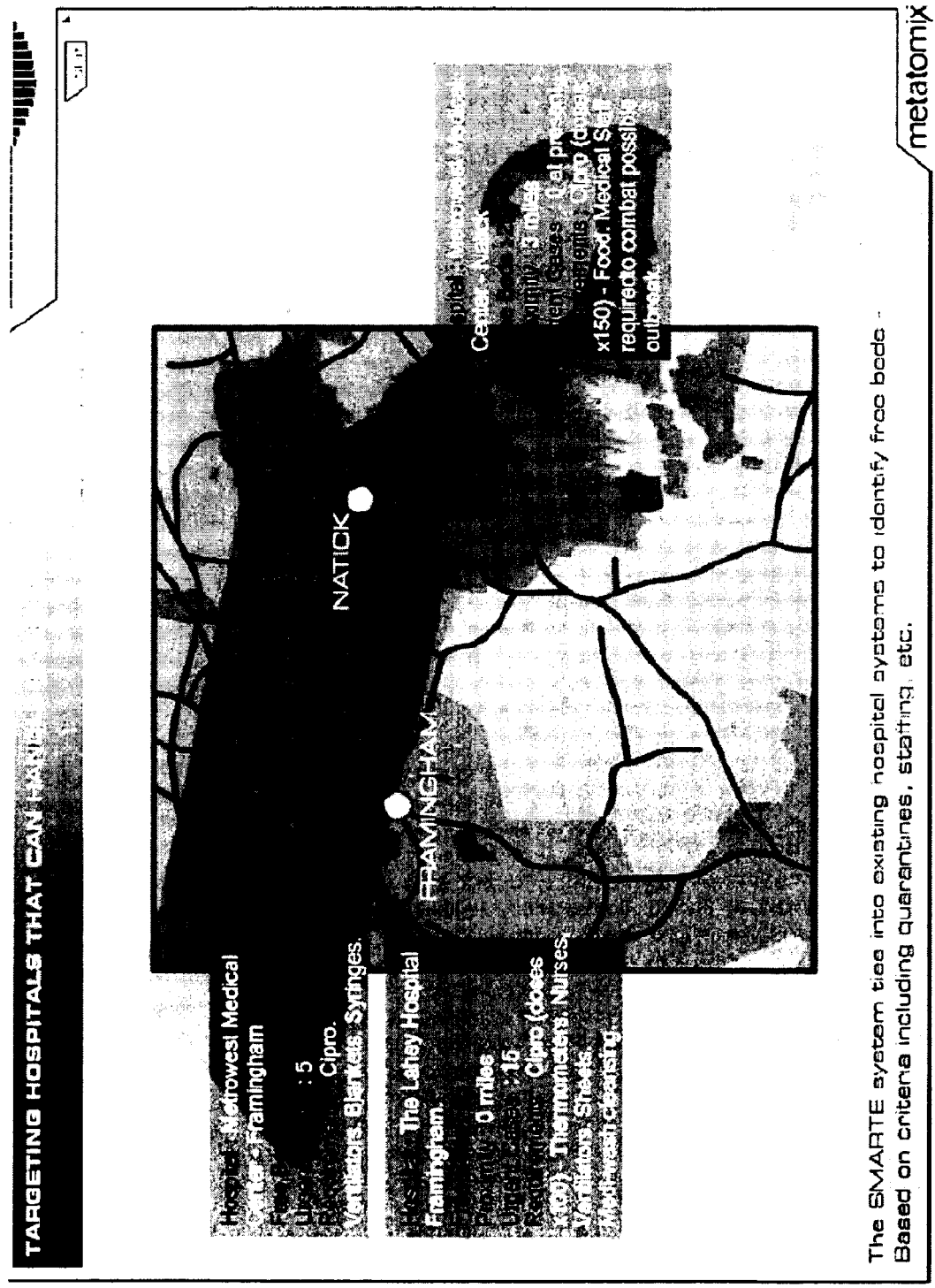

FIG. 18 illustrates another graphical display 1500, by which the system can display an alert. In the example of FIG. 18, two potential outbreaks of anthrax are shown. For each potential outbreak, the system displays information, such as proximity of the outbreak to the nearest residential area, as well as the population of the residential area, proximity to the nearest emergency medical center and the number of free beds in the medical center. Being tied into existing hospital systems, the surveillance, monitoring and real-time events application can query those hospital systems and display relevant information, as shown in FIG. 19.

A more complete understanding of the construction and operation of the components 108, 114, 116 and 118 and, more generally, of the system 100 that they comprise may be attained by reference to the aforementioned incorporated-by-reference applications, namely, U.S. Patent Application Ser. No. 60/547,167, filed Feb. 23, 2004, entitled, "Enterprise Information Integration and Enterprise Resource Interoperability Platform and Methods"; U.S. patent application Ser. No. 10/680,049, filed Oct. 7, 2003, entitled "Methods and Apparatus for Identifying Related Nodes in a Directed Graph Having Named Arcs" (corresponding PCT Application WO2004034625, published Apr. 22, 2004); U.S. patent application Ser. No. 09/917,264, filed Jul. 27, 2001, entitled "Methods and Apparatus for Enterprise Application Integration" (corresponding to WO02093319, published Nov. 21, 2002); U.S. patent application Ser. No. 10/051,619, filed Oct. 29, 2001, entitled "Methods And Apparatus For Real-Time Business Visibility Using Persistent Schema-Less Data Storage" (corresponding to WO02093410, published Nov. 21, 2002); U.S. patent application Ser. No. 10/302,764, filed Nov. 21, 2002, entitled "Methods and Apparatus for Querying a Relational Data Store Using Schema-Less Queries" (corresponding to PCT Application WO03044634, published May 30, 2003); U.S. patent application Ser. No. 10/302,727, filed Nov. 21, 2002, entitled "Methods and Apparatus for Statistical Data Analysis and Reduction for an Enterprise Application" (corresponding to PCT Application WO03046769, published May 5, 2003); U.S. patent application Ser. No. 10/138,725, filed May 3, 2002, entitled "Methods and Apparatus for Visualizing Relationships Among Triples of Resource Description Framework (RDF) Data Sets" (corresponding to PCT Application WO03094142, published Nov. 13, 2003) the teachings of which, again, are incorporated herein by reference.

Figure 6:
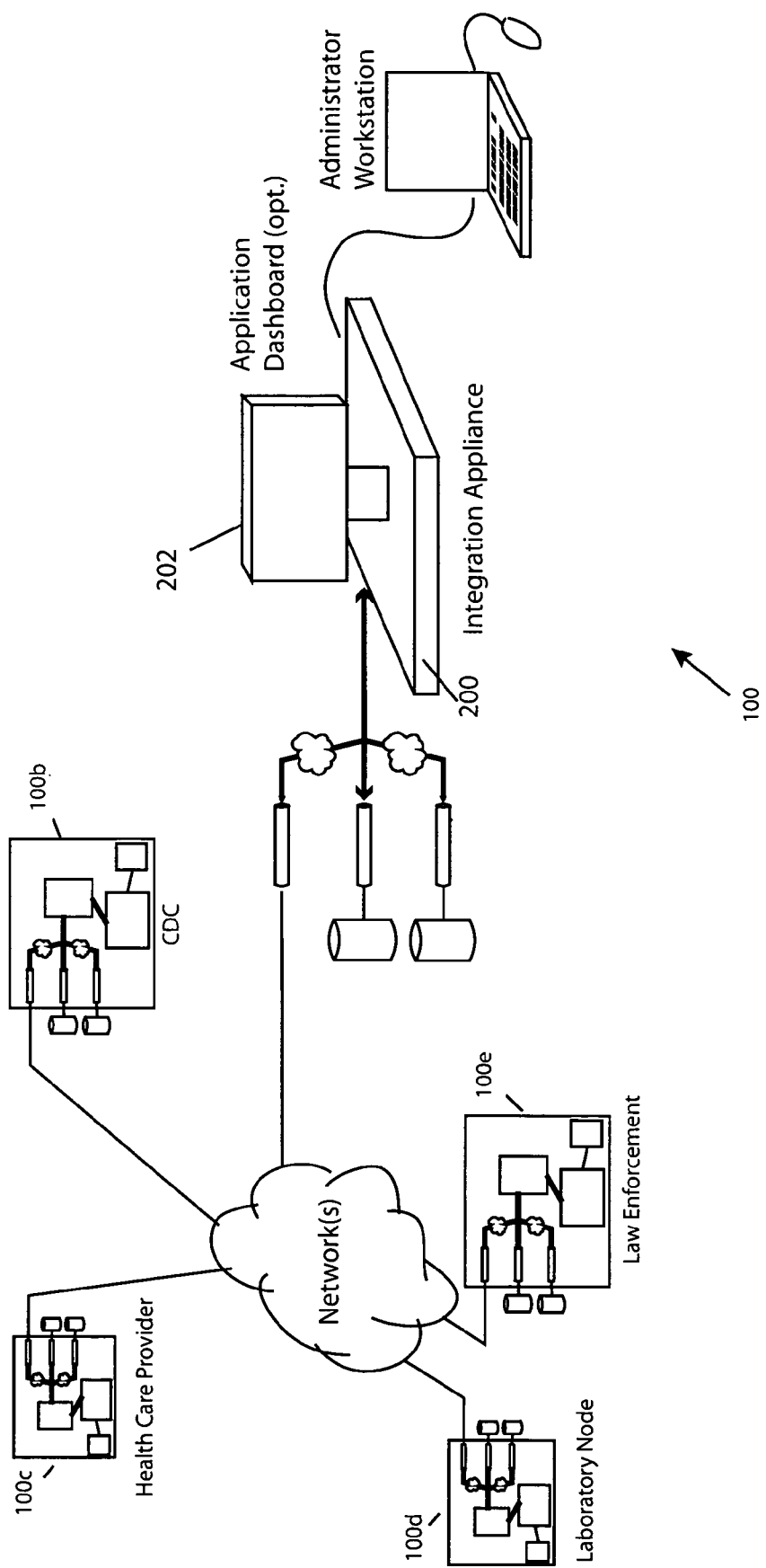
FIG. 6 depicts the system of FIG. 5 that further utilizes a server/application appliance according to the invention.

FIG. 6 depicts a surveillance, monitoring and real-time events system 100 as described above in which one or more functions of the digital data processing application resident at the respective node are carried out by computer 200—here, depicted having the form-factor of a server or application "appliance" (but optionally having other form factors in other embodiments). In the illustrated embodiment, the functions subsumed by appliance 200 are those of data store 114 and server 116, though in other embodiments it may have other functions in addition or instead.

In the illustrated embodiment, appliance 200 is configured to provide automatic integration and correlation functions, among others, thereby facilitating its installation and use at a node. In other embodiments, other functions may be configured for automatic operation, in addition or instead. To this end, illustrated appliance includes display 202 configured to display output of the above-mentioned dashboard application. Such display 202 is optional, however, and may not be provided in other embodiments.

With respect to integration, illustrated appliance 200 provides for automatic or semiautomatic recognition (e.g., of networks, other nodes, data sources, and so forth), automatic or semi-automatic configuration (e.g., with respect to other computers and equipment in the same node, data sources, other nodes, and so forth), drag-and-drop, double-click or other user-responsive administration, and process automation. With respect to correlation, illustrated appliance 200 provides for automatic or semi-automatic ontology, framework selection (OFS), e.g., with respect to PHIN, HAN, NEDSS or other public health & bioterrorism applications, border & port security applications, public & community safety applications, and government data integration applications, among others, automatic data source ontology selection, and drag-and-drop ontology mapping. Additional automatic or semi-automatic functions provided by the appliance 200 include natural language rules administration, real-time reporting, and inferencing. As noted, in other embodiments, appliance 200 may provide other functions automatically or semi-automatically, in addition or instead of those listed above.

A further understanding of appliance 200, as used on one embodiment of the invention is provided in the sections that follow.

In the illustrated embodiment, appliance 200 is an intelligent, scalable, dynamically configurable integration appliance provided to customers in a ready-to-use format. It can be quickly and easily set up, turned on, configured, and used, saving time and labor, and money. 12B is a server-based, fully functioning information integration platform, with unprecedented capabilities.

As such, illustrated appliance 200 is ideally suited to users who demand quick, easy, scalable, even portable information integration solutions for a variety of needs. These include public sector applications, such as political conventions, military applications, temporary professional sporting event venues, natural disasters, storm tracking, many more high visibility, security-intensive events; commercial sector applications, such as small company information integration, financial institution mergers for rapid integration and insights, "know your customer" initiatives for smaller financial institutions, information integration for individual travel agents, tour companies, and so forth. Moreover, appliance 200 handles any type of data, for example wide variety of chemical, radiological, and other sensor data, government alerts including homeland security status, amber alerts, etc., meteorological information, traffic and transit information, real-time audio/video feeds and still imagery, ground-penetrating and surface radar, aerial imagery from reconnaissance flights and satellites, passive or tripwire sensor readings, GIS maps, hospital resource data: beds, staffing, equipment, medical condition and treatment information, epidemiological/syndromic surveillance data, customer spending and preferences, and financial account information, again, among others.

Illustrated appliance 200 facilitates quick and easy connections to any data source, integrates the data sources, and provides the ability to interact with all of the information, in real-time. It provides interoperability and decision-making capabilities to the user quickly, dynamically, and efficiently. Appliance 200 can handle additional data sources on-the-fly, reflecting that information in the dashboard. There is no need for costly customization to data connections and dashboards—this powerful system handles all of that. It even integrates an expert system to automate critical alerts and notifications when certain conditions exist, based on pre-set rules.

Appliance 200 creates knowledge and provides an unprecedented level of awareness and response by synthesizing information that could not previously be organized, processed, or acted upon.

Described herein are methods and apparatus meeting the above-mentioned objects. It will be appreciated that the illustrated embodiment is merely an example of the invention and that other embodiments, incorporating changes to those described herein, fall within the scope of the invention. Thus, for example, as noted earlier, although the illustrated embodiment is adapted for use in public health & bioterrorism application (with additional examples provided with respect to border and port security) it will be appreciated that a similar such systems can be applied in public & community safety, and government data integration applications, described above, among others.

The invention claimed is:

1. A method of enterprise integration, the method comprising, with one or more digital data processors having one or more programmed processors, executing the steps of:
   A. obtaining data from one or more first data sources, the data being encoded in a first set of Resource Description Framework (RDF) triples;
   B. executing a rules engine to process the first set of RDF triples in order to identify data from the one or more first data sources that relates to a criteria and to classify that data to be one or more of ignored, stored, logged for alert, broadcast, and displayed, wherein identifying data from the one or more first data sources that relates to a criteria comprises:
      (i) identifying as related data substantially matching the criteria, and
      (ii) identifying as related data that is a direct ancestor of data identified in any of steps (i) and (ii), and that is not in substantial conflict with the criteria;
   C. responding to at least selected data classifications by obtaining data from one or more second data sources, the data being encoded in a second set of RDF triples;
   D. executing the rules engine to process at least the second set of triples in order to any of further classify the data, ignore the data, store the data, generate an alert, generate a broadcast, and generate a message, and display the data.

2. The method of claim 1, wherein any of the first and second data sources is a data stream.

3. The method of claim 1, wherein any of the first and second data sources is a database.

4. The method of claim 1, wherein the rules engine identifies RDF triples that are related to a selected criteria.

5. The method of claim 1, wherein the rules engine generates alerts and/or messages for presentation to an operator based on the classification of the data.

6. The method of claim 1, further comprising extracting data from one or more data sources, and a converting the data into the RDF triples.

7. The method of claim 1, wherein any of the one or more first data sources and the one or more second data sources are compliant with a public health information network (PHIN) protocol, a health area network (HAN) protocol, National Electronic Disease Surveillance System (NEDSS) protocol, or other protocol for communication of health and/or bioterrorism data.

8. The method of claim 1, wherein the one or more digital data processors comprise a data processing station resident at a node of a public health information network (PHIN), a health area network (HAN), National Electronic Disease Surveillance System (NEDSS) network, or other network for communication of health and/or bioterrorism data.

9. The method of claim 1, wherein the one or more digital data processors comprise an integration appliance.

10. A method of enterprise integration, the method comprising, with one or more digital data processors having one or more programmed processors, executing the steps of:
    A. receiving one or more RDF data streams comprising data encoded in RDF triples; executing a rules engine to find related RDF triples by the steps of:
       (i) identifying as related data substantially matching a criteria, and
       (ii) identifying as related data that is a direct ancestor of data identified in any of steps (i) and (ii), and that is not in substantial conflict with the criteria; and
    B. responding to related RDF triples by the rules engine applying further processing of the data when certain relationships between the RDF triples are detected by the rules engine.

11. The method of claim 10, wherein the rules engine identifies RDF triples that are related to criteria in a query.

12. The method of claim 11, wherein the rules engine generates alerts and/or messages for presentation to an operator based on the identified RDF triples.

13. The method of claim 10, further comprising a extracting data from one or more data sources, and a converting the data into the RDF triples.

14. The method of claim 10, wherein the rules engines determines a classification level of data in the RDF data streams, where the classification level determines the further action taken by the rules engine.

15. The method of claim 10, wherein the one or more RDF data streams comprise information received in accordance with a public health information network (PHIN) protocol, a health area network (HAN) protocol, National Electronic Disease Surveillance System (NEDSS) protocol, or other protocol for communication of health and/or bioterrorism data.

16. The method of claim 10, wherein the one or more digital data processors comprise a data processing station resident at a node of a public health information network (PHIN), a health area network (HAN), National Electronic Disease Surveillance System (NEDSS) network, or other network for communication of health and/or bioterrorism data.

17. The method of claim 10, wherein the one or more digital data processors comprise an integration appliance.

18. A method of enterprise integration, the method comprising, with one or more digital data processors having one or more programmed processors, executing the steps of:
   A. receiving one or more RDF data streams comprising data encoded in RDF triples;
   B. executing a rules engine to process the RDF triples in order to identify data from the one or more RDF data streams that relates to a criteria and to classify that data to be one or more of ignored, stored, logged for alert, broadcast, and displayed, wherein identifying data from the one or more RDF data streams that relates to a criteria comprises:
      (i) identifying as related data substantially matching the criteria, and
      (ii) identifying as related data that is a direct ancestor of data identified in any of steps (i) and (ii), and that is not in substantial conflict with the criteria;
   C. responding to the classification of the data and the related RDF triples by the rules engine applying further processing of the data.

19. The method of claim 18, wherein the rules engine identifies RDF triples that are related to criteria in a query.

20. The method of claim 19, wherein the rules engine generates alerts and/or messages for presentation to an operator based on the identified RDF triples.

21. The method of claim 18, further comprising extracting data from one or more data sources, and converting the data into the RDF triples.

22. The method of claim 18, wherein the rules engines determines a classification level of data in the RDF data streams, where the classification level determines the further action taken by the rules engine.

23. The method of claim 18, wherein the one or more RDF data streams comprise information received in accordance with a public health information network (PHIN) protocol, a health area network (HAN) protocol, National Electronic Disease Surveillance System (NEDSS) protocol, or other protocol for communication of health and/or bioterrorism data.

24. The method of claim 18, wherein the one or more digital data processors comprise a data processing station resident at a node of a public health information network (PHIN), a health area network (HAN), National Electronic Disease Surveillance System (NEDSS) network, or other network for communication of health and/or bioterrorism data.

25. The method of claim 18, wherein the one or more digital data processors comprise an integration appliance.

26. A data processing system for enterprise integration, the system comprising:
   a plurality of data sources; and
   one or more digital data processors having one or more processors, storage units, and/or communication devices, said one or more digital data processors being coupled to the data sources and comprising:
      conversion functionality to convert data from the data sources into Resource Description Framework (RDF) triples; and
      a rules engine coupled to the data sources to process the RDF triples, the processing comprising identifying data from the one or more data sources that relates to a criteria and to classify that data to be one or more of ignored, stored, logged for alert, broadcast, and displayed, wherein identifying data from the one or more data sources that relates to a criteria comprises:
         (i) identifying as related data substantially matching the criteria, and
         (ii) identifying as related data that is a direct ancestor of data identified in any of steps (i) and (ii), and that is not in substantial conflict with the criteria;
      wherein the classification of the RDF triples can trigger additional function of the rules engine.

27. The method of claim 26, wherein one or more of the plurality of data sources are compliant with a public health information network (PHIN) protocol, a health area network (HAN) protocol, National Electronic Disease Surveillance System (NEDSS) protocol, or other protocol for communication of health and/or bioterrorism data.

28. The method of claim 26, wherein the one or more digital data processors comprise a data processing station resident at a node of a public health information network (PHIN), a health area network (HAN), National Electronic Disease Surveillance System (NEDSS) network, or other network for communication of health and/or bioterrorism data.

29. The method of claim 26, wherein the one or more digital data processors comprise an integration appliance.

30. A data processing system for enterprise integration, the system comprising:
   a plurality of data sources; and
   one or more digital data processors having one or more processors, storage units, and/or communication devices, said one or more digital data processors being coupled to the data sources and comprising:
      conversion functionality to convert data from the data sources into Resource Description Framework (RDF) triples; and
      a rules engine coupled to the data sources to process the RDF triples, the processing comprising identifying data from the one or more data sources that relates to a criteria and to classify that data to be one or more of ignored, stored, logged for alert, broadcast, and displayed, wherein identifying data from the one or more data sources that relates to a criteria comprises:
         (i) identifying as related data substantially matching the criteria, and
         (ii) identifying as related data that is a direct ancestor of data identified in any of steps (i) and (ii), and that is not in substantial conflict with the criteria;
      wherein the rules engine generates alerts and/or messages for presentation to an operator based on the identified RDF triples.

* * * * *